US008613881B2

(12) United States Patent
Soong

(10) Patent No.: US 8,613,881 B2
(45) Date of Patent: Dec. 24, 2013

(54) CONDUCTIVE POLYMER FOAMS, METHOD OF MANUFACTURE, AND USES THEREOF

(75) Inventor: Sharon Y. Soong, Natick, MA (US)

(73) Assignee: Rogers Corporation, Rogers, CT (US)

(*) Notice: Subject to any disclaimer, the term of this patent is extended or adjusted under 35 U.S.C. 154(b) by 408 days.

(21) Appl. No.: 12/979,998

(22) Filed: Dec. 28, 2010

(65) Prior Publication Data

US 2011/0155945 A1 Jun. 30, 2011

Related U.S. Application Data

(63) Continuation-in-part of application No. 12/404,566, filed on Mar. 16, 2009, now abandoned, and a continuation-in-part of application No. 12/186,093, filed on Aug. 5, 2008, which is a continuation-in-part of application No. 12/027,018, filed on Feb. 6, 2008, now Pat. No. 7,815,998.

(60) Provisional application No. 60/888,360, filed on Feb. 6, 2007, provisional application No. 61/290,688, filed on Dec. 29, 2009.

(51) Int. Cl.
*B29C 67/00* (2006.01)

(52) U.S. Cl.
USPC .................................. 264/439; 264/41

(58) Field of Classification Search
USPC ........... 264/46.2, 41, 405, 440; 427/127, 128, 427/129, 130, 131, 547
See application file for complete search history.

(56) References Cited

U.S. PATENT DOCUMENTS

| | | | |
|---|---|---|---|
| 3,359,145 A | 12/1967 | Salyer et al. | |
| 3,523,988 A | 8/1970 | Roehr et al. | |
| 4,113,981 A | 9/1978 | Fujita et al. | |
| 4,209,481 A | 6/1980 | Kashiro et al. | |
| 4,378,322 A | 3/1983 | Atterbury et al. | |
| 4,546,037 A | 10/1985 | King | |
| 4,548,862 A * | 10/1985 | Hartman | 428/323 |
| 4,602,310 A | 7/1986 | Fenster | |
| 4,643,499 A | 2/1987 | Mitchell | |
| 4,644,101 A | 2/1987 | Jin et al. | |

(Continued)

FOREIGN PATENT DOCUMENTS

| | | |
|---|---|---|
| GB | 2458066 | 10/2011 |
| WO | 2006128741 A1 | 12/2006 |

(Continued)

OTHER PUBLICATIONS

Simpson, "Conductive Polymer Foams, Method of Manufacture, and Uses Thereof", Non-Final Office Action dated Oct. 11, 2011, pp. 1-7.

(Continued)

*Primary Examiner* — Galen Hauth
(74) *Attorney, Agent, or Firm* — Cantor Colburn LLP

(57) ABSTRACT

A polymer foam layer is disclosed, comprising a polymer foam and a plurality of electrically conductive particles dispersed within the polymer foam, polymer foam layer having an unabraded first surface and an opposite, second surface, wherein the electrically conductive particles essentially continuously span the polymer foam layer, and a portion of the electrically conductive particles are exposed at the first surface of the layer and another portion of the electrically conductive particles are exposed at the second surface. The foams are useful as gaskets for electromagnetic shielding, grounding pads, battery contact conductive spring elements, and the like.

11 Claims, 3 Drawing Sheets

(56) References Cited

U.S. PATENT DOCUMENTS

| | | | |
|---|---|---|---|
| 4,737,112 A | 4/1988 | Jin et al. | |
| 4,769,166 A | 9/1988 | Harrison | |
| 4,778,635 A | 10/1988 | Hechtman et al. | |
| 4,793,814 A | 12/1988 | Zifcak et al. | |
| 4,820,376 A * | 4/1989 | Lambert et al. | 216/11 |
| 4,838,347 A * | 6/1989 | Dentini et al. | 165/185 |
| 4,902,857 A | 2/1990 | Cranston et al. | |
| 4,923,739 A | 5/1990 | Jin et al. | |
| 4,960,612 A | 10/1990 | Dentini et al. | |
| 5,045,249 A | 9/1991 | Jin et al. | |
| 5,049,982 A | 9/1991 | Lee et al. | |
| 5,095,337 A | 3/1992 | Yamaguchi | |
| 5,132,058 A | 7/1992 | Suyama et al. | |
| 5,152,937 A | 10/1992 | Tetu | |
| 5,155,302 A | 10/1992 | Nguyen | |
| 5,206,585 A | 4/1993 | Chang et al. | |
| 5,240,761 A | 8/1993 | Calhoun et al. | |
| 5,275,856 A | 1/1994 | Calhoun et al. | |
| 5,304,460 A | 4/1994 | Fulton et al. | |
| 5,313,840 A | 5/1994 | Chen et al. | |
| 5,317,255 A | 5/1994 | Suyama et al. | |
| 5,334,029 A | 8/1994 | Akkapeddi et al. | |
| 5,417,577 A | 5/1995 | Holliday et al. | |
| 5,429,701 A | 7/1995 | Lu | |
| 5,443,876 A | 8/1995 | Koskenmaki et al. | |
| 5,509,815 A | 4/1996 | Jin et al. | |
| 5,522,962 A | 6/1996 | Koskenmaki et al. | |
| 5,591,037 A | 1/1997 | Jin et al. | |
| 5,607,882 A | 3/1997 | Lambert et al. | |
| 5,618,189 A | 4/1997 | Jin et al. | |
| 5,733,322 A | 3/1998 | Starkebaum | |
| 5,769,998 A | 6/1998 | Tanzawa et al. | |
| 5,795,162 A | 8/1998 | Lambert | |
| 5,846,357 A | 12/1998 | Meteer et al. | |
| 5,851,644 A | 12/1998 | McArdle et al. | |
| 6,011,307 A | 1/2000 | Jiang et al. | |
| 6,067,430 A | 5/2000 | Mammino et al. | |
| 6,168,736 B1 | 1/2001 | Harrison et al. | |
| 6,376,393 B1 | 4/2002 | Newton et al. | |
| 6,410,846 B1 | 6/2002 | Benn, Jr. | |
| 6,476,113 B1 | 11/2002 | Hiles | |
| 6,574,114 B1 | 6/2003 | Brindle et al. | |
| 6,613,267 B1 | 9/2003 | Konno | |
| 6,613,976 B1 | 9/2003 | Benn, Jr. | |
| 6,809,280 B2 | 10/2004 | Divigalpitiya et al. | |
| 6,844,378 B1 | 1/2005 | Martin et al. | |
| 6,854,985 B1 | 2/2005 | Weiss | |
| 6,854,986 B2 | 2/2005 | Weiss | |
| 6,915,701 B1 | 7/2005 | Tarler | |
| 7,081,292 B2 | 7/2006 | Kaplo | |
| 7,161,090 B2 | 1/2007 | Mattsson et al. | |
| 7,645,399 B2 | 1/2010 | Tarnawskyj et al. | |
| 7,815,998 B2 | 10/2010 | Simpson et al. | |
| 7,850,870 B2 | 12/2010 | Ahn et al. | |
| 7,875,345 B1 | 1/2011 | Simpson et al. | |
| 2003/0211250 A1 | 11/2003 | Nakamuta et al. | |
| 2005/0062024 A1 | 3/2005 | Bessette et al. | |
| 2005/0286966 A1 | 12/2005 | Gueret | |
| 2007/0246245 A1 | 10/2007 | Ahn et al. | |
| 2008/0213565 A1 * | 9/2008 | Simpson et al. | 428/319.1 |
| 2008/0311378 A1 | 12/2008 | Simpson | |
| 2009/0226696 A1 | 9/2009 | Simpson | |

FOREIGN PATENT DOCUMENTS

| | | |
|---|---|---|
| WO | 2008074705 A1 | 6/2008 |
| WO | 2008097570 A1 | 8/2008 |
| WO | 2008097571 A1 | 8/2008 |
| WO | 2010016834 A1 | 2/2010 |
| WO | 2011082058 A1 | 7/2011 |

OTHER PUBLICATIONS

Gallagher et al., Transient Liquid Phase Sintering Conductive Adhesives as Solder Replacements, May 19-21, 1997, 7 pages.

Davis, L.C., Model of magnetorheological elastomers, Journal of Applied Physics, Mar. 15, 1999, pp. 3348-3351, vol. 85, No. 6.

Ginder, et al., Magnetorheological Elastomers: Properties and Applications, SPIE, Mar. 1999, pp. 131-138, vol. 3675.

Jolly, et al., The Magnetoviscoelastic Response of Elastomer Composites Consisting of Ferrous Particles Embedded in a Polymer Matrix, Journal of Intelligent Material Systems and Structures, Nov. 1996, pp. 613-622, vol. 7.

Nusil Technology, R-2350 Flame Retardant, RTV Silicone Foam Product Profile, Dec. 15, 2006, 2 pgs.

World Properties, Inc.; Simpson et al; Written Opinion for International Search Report for International Application No. PCT/US2008/072240, mailed Apr. 12, 2009, 8 pages.

World Properties, Inc.; Simpson et al; International Search Report for International Application No. PCT/US2008/072240, mailed Apr. 13, 2009, 8 pages.

Shen, et al., Experimental Research and Modeling of Magnetorheological Elastomers, Journal of Intelligent Material Systems and Structures, Jan. 2004, pp. 27-35, vol. 15.

World Properties, Inc.; Simpson et al; Written Opinion for International Search Report for International Application No. PCT/2008/001564.

World Properties, Inc.; Simpson et al; International Search Report for International Application No. PCT/2008/001564.

Rogers Corporation; Simpson et al; Written Opinion for International Application No. PCT/US2010/061774, mailed Mar. 30, 2011.

Rogers Corporation; Simpson et al; International Search Report for International Application No. PCT/US2010/061774, mailed Mar. 30, 2011.

United Kingdom Office Action for UK Application No. 0913320.8, mailed on Feb. 17, 2012.

* cited by examiner

US 8,613,881 B2

CONDUCTIVE POLYMER FOAMS, METHOD OF MANUFACTURE, AND USES THEREOF

CROSS-REFERENCE TO RELATED APPLICATION

This application claims the benefit of U.S. Provisional Application Ser. No. 61/290,688 filed Dec. 29, 2009 and is a continuation-in-part of co-pending U.S. application Ser. No. 12/404,566 filed on Mar. 16, 2009 and published as U.S. Publication. No. 2009/0226696, which is a continuation-in-part of U.S. application Ser. No. 12/186,093 filed on Aug. 5, 2008, which is a continuation-in-part of U.S. application Ser. No. 12/027,018 filed on Feb. 6, 2008 and is now U.S. Pat. No. 7,815,998, which claims the benefit of U.S. Provisional Application No. 60/888,360 filed on Feb. 6, 2007, all of which are incorporated herein by reference in their entirety.

BACKGROUND

This disclosure relates to electrically conductive polymers, and methods of manufacture thereof, as well as articles comprising the polymers.

Electrically conductive polymer foams are of utility in a wide variety of applications, including as electrical contacting devices, in sensors, and in applications requiring electromagnetic interference (EMI)/radio frequency interference (RFI) shielding and/or electrostatic dissipation. Current materials capable of EMI/RFI shielding include, for example, beryllium-copper finger stock, metal foil or metallized fabric wrapped around non-conductive foam gaskets, non-conductive gaskets coated with conductive materials, and metal-containing fillers loaded into silicone resins. Other electrically conductive foams are also known, for example certain polyurethanes and polyolefins. One difficulty with currently available methods and materials is that the addition of the high levels of conductive filler(s) sufficient to achieve high conductivity affects the compressibility and processability of the polymer. In addition, use of such high filler levels increases the cost of the polymer blend. Users are often forced to make a trade-off between the cost and the quality of the material.

It would be advantageous to provide polymer foams where the amount of added filler is minimized, while maintaining a suitable electrical conductivity. It would be a further advantage that the compressibility, processability, and other physical properties of the foam that are desired for a particular application not be significantly adversely affected.

There accordingly remains a need in the art for compositions and methods whereby polymer foam can provide suitable electrical conductivity, compressibility, and processability, particularly without significant adverse effect on one or more physical properties desired for a particular application.

BRIEF SUMMARY

Disclosed herein is a layer comprising a polymer foam, the polymer foam layer having an unabraded first surface and an opposite, second surface; and a plurality of electrically conductive particles dispersed within the polymer foam layer, wherein the electrically conductive particles essentially continuously span the polymer foam layer, and a portion of the electrically conductive particles are exposed at the first surface of the layer and another portion of the electrically conductive particles are exposed at the second surface. In a further embodiment, a portion of the electrically conductive particles are exposed and project from the second surface, or are exposed and project from both the first and second surfaces.

Further disclosed is a layer comprising a polymer foam, the polymer foam layer having an unabraded first surface and an opposite, second surface; and a plurality of electrically conductive particles aligned into mutually isolated columns having a first end and a second end, wherein the electrically conductive particles essentially continuously span the polymer foam layer, and the first ends of the columns are exposed at the first surface of the layer and the second ends of the columns are exposed at the opposite second surface. In a further embodiment, one or more ends of the columns are exposed and project from the first surface, or are exposed and project from both the first and second surfaces.

Methods of manufacturing the polymer foams are also described.

The above discussed and other features and advantages of the present invention will be appreciated and understood by those skilled in the art from the following figures and detailed description.

BRIEF DESCRIPTION OF THE DRAWINGS

In the exemplary drawings, like elements are numbered alike in the several Figures.

DETAILED DESCRIPTION

Figure 1A:
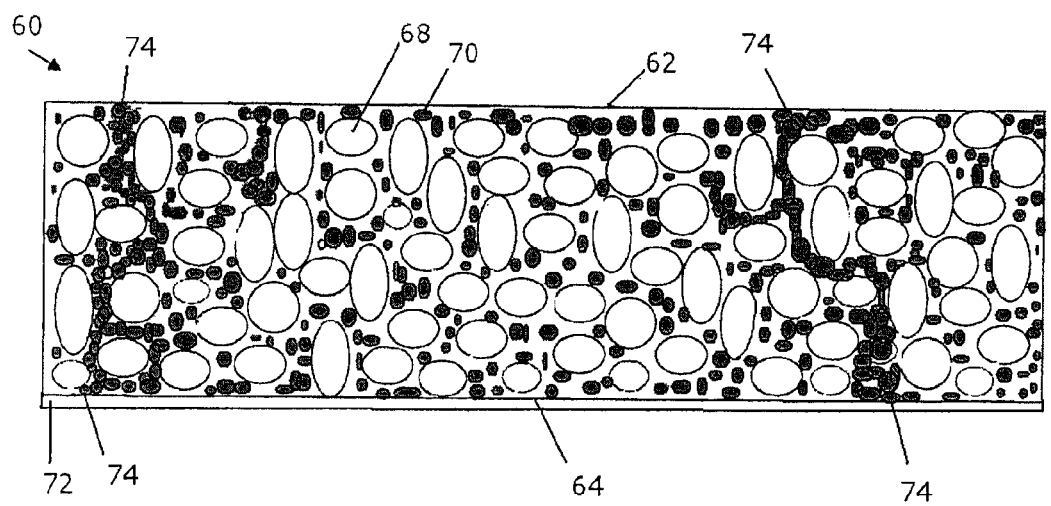
FIGS. 1A-1B are schematic diagrams of an exemplary electrically conductive polymer foam layer with dispersed electrically conductive particles that are partially embedded into a removable layer adjoining a first surface and exposed at an opposite second surface.

Polymer foams containing electrically conductive particles that are manufactured by casting onto a release carrier can have unexpectedly low electrical conductivity. It has been found by the inventors hereof that one source of lower conductivity is that the electrically conductive particles are less exposed at the foam surface in contact with the release carrier, than the opposite surface not in contact with the release carrier. Thus, while the conductive particles are adequately exposed for conductivity at the top surface of the polymer foams, the exposure at the bottom surface adjoining a release carrier is impaired. This is due to a skin-like layer that forms adjacent the release carrier upon curing the polymer foam. Upon removal of the release carrier, the skin layer impedes surface exposure of the electrically conductive particles. Although the skin layer can be removed by methods such as mechanical abrading, abrading adds an additional step to production, increases cost, and is difficult to perform consistently, particularly with low density foam.

Accordingly, disclosed herein are polymer foams disposed on a removable layer, wherein electrically conductive particles are dispersed within the foams or magnetically aligned into columns within the foams. The electrically conductive particles are partially embedded in the removable layer so as to increase surface exposure of the electrically conductive particles when the removable layer is removed. This in turn enhances surface contact of electrically conductive particles with, e.g., another conductive layer, and reduces or eliminates the need to further process the foam surface in order to obtain sufficient particle contact at the surface of the foam layer.

The removable layer can be selected from a wide variety of materials that allow the electrically conductive particles to become embedded during formation of the polymer foam. For example, the removable layer can be meltable just prior to or during cure or solidification of the polymer foam. Heat and a force, such as magnetic force, are applied to the foam and the removable layer at a strength and for a time effective to allow the removable layer to soften and allow the particles adjoining the removable layer to partially embed into the removable layer. After the conductive polymer foam layer has cured or solidified and the removable layer has re-solidified, the removable layer is removed and the particles that were partially embedded in the removable layer are now exposed at the surface and/or project from the surface.

Advantageously, surface contact of electrically conductive particles can be achieved without significantly adversely affecting the physical properties of the polymer foams in order to more fully expose the conductive particles. Thus, in one embodiment, polymer foams are produced that are electrically conductive, and that also substantially retain one or more of their compressibility, flexibility, compression set resistance, cell uniformity, and the like. These materials are particularly suitable for use in the formation of articles that can provide shielding from EMI and/or RFI.

In a general process for producing the electrically conductive polymer foams, the polymer composition used to form the foam is combined with the conductive particles (and any other optional additives), and used to form a layer having a first side and an opposite second side. Depending on the polymer, foaming can be performed prior to casting, during casting, or after casting. The polymer foam is formed by casting the foam or foamable composition onto a carrier. Thus, a first (bottom) carrier is provided, and a layer having a first surface and an opposite second surface is formed on the carrier, wherein the first surface of the foam layer is disposed on the first carrier. A second (top) carrier can be disposed onto the second surface of the layer. The first carrier, the second carrier, or both are a removable layer, or are provided with a removable layer, such that the removable layer is in contact with the first surface of the cast layer, the second surface of the cast layer, or both. In one embodiment, after solidification or cure of the polymer foam layer, removal of the removable layer exposes the particles at the surface of the foam layer in contact with the removable layer. In another embodiment, removing the removable layer is configured to also remove a portion (e.g., thin layer) of foam from the foam layer, thereby exposing more of the conductive particles on the surface of the foam layer than would be exposed when the removable layer is removed without also removing a portion of the foam layer.

Figure 1B:
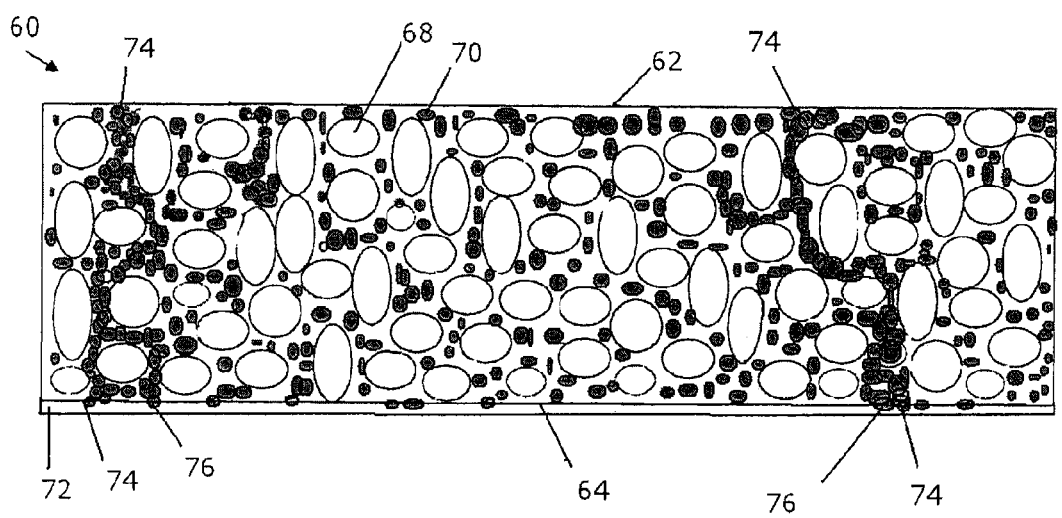

For example, FIGS. 1A-1B show an embodiment of a polymer foam 60 comprising a first surface 64, an opposite second surface 62, cells 68, and electrically conductive particles 70. The polymer foam 60 is disposed on a removable layer 72 and the electrically conductive particles 70 are dispersed within the polymer foam. FIGS. 1A-1B shows the foam comprising a multiplicity of cells between the first surface and the second opposite surface. In another embodiment, a single cell can span the first surface and the opposite second surface. In FIG. 1A the electrically conductive particles 70 form pathways 74 that essentially continuously span the polymer foam layer from the first surface 64 to the opposite second surface 62. Particles 70 are partially exposed at the second surface 64, but less so at the first surface 64 contacting the removable layer 72.

Referring now to FIG. 1B, in order to increase exposure of the particles 70 at the first surface 64, the cast layer is subjected to a force at a strength and for a time effective to partially embed the particles 70 into the removable layer 72. For example, the removable layer 72 can be exposed to heat at a temperature and for a time effective to soften the removable layer 72 and allow the conductive particles 70 (under force of gravity, e.g., and/or a magnetic field) to migrate and partially embed into the removable layer 72. FIG. 1B shows that the partially embedded particles 76 also partially remain in the polymer foam 60. While some particles can be fully embedded in the removable layer 72, such particles do not remain with the polymer foam layer.

After the foam layer has partially or fully cured, the removable layer can be removed (not shown) so as to more fully expose the conductive particles on the second surface. Removal can occur before or after full cure of the polymer foam layer. In one embodiment, removal simple exposes the conductive particles at a surface of the foam layer. In another embodiment, removal of the removable layer also removes a portion of the foam layer surface itself, thereby exposing even more of the conductive particles at the surface. The resulting foam layer now has conductive ends of the particles that are exposed at the surface formerly adjoining the removable layer. Where the removable layer has sufficient structural integrity or is disposed on a carrier film, the removable layer can be peeled off from the polymer foam. Alternatively, the removable layer can be melted off at an effective temperature that maintains the integrity of the polymer foam and pathways, while exposing the embedded particles 76.

Figure 2A:
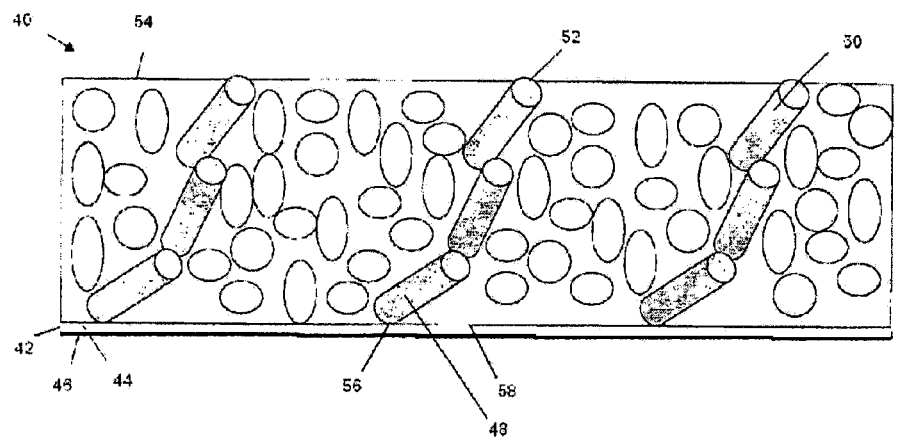
FIGS. 2A-2C are schematic diagrams of a method for manufacturing an exemplary electrically conductive polymer foam with mutually isolated columns of magnetic, electrically conductive particles on a removable layer so as to form columns exposed on surface of the polymer foam.
Figure 2B:
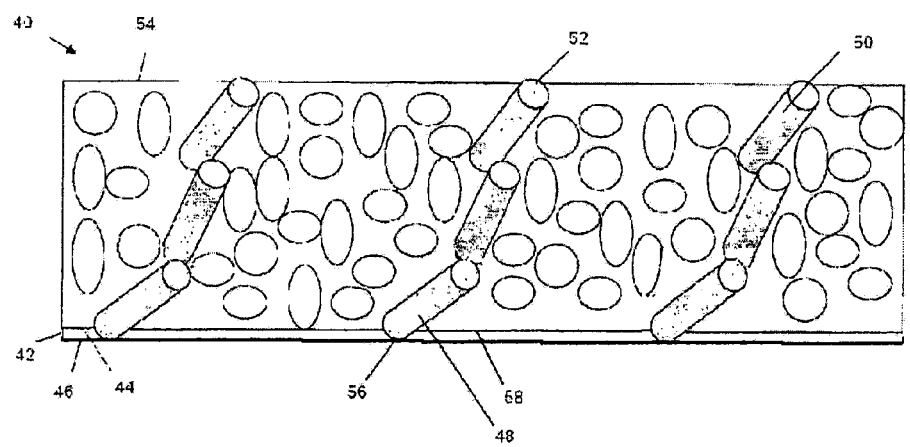
Figure 2C:
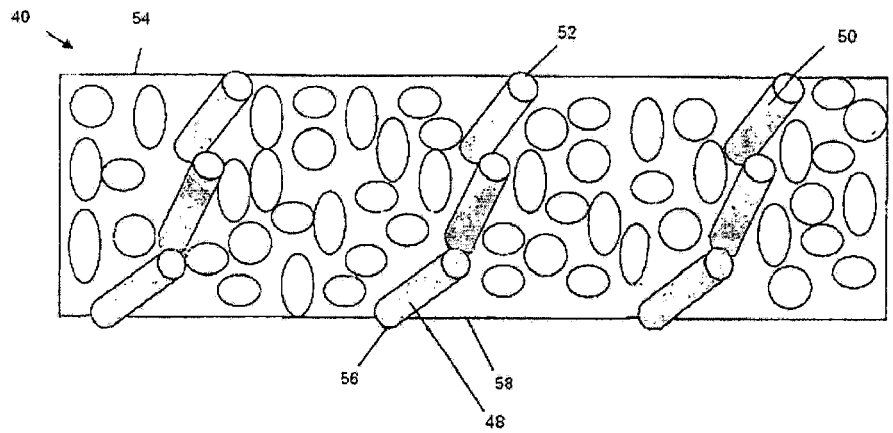

FIGS. 2A-2C show another embodiment of a method of manufacturing electrically conductive polymer foam having mutually isolated columns of magnetic, electrically conductive particles, wherein the particles are aligned using a magnetic field. Where a magnetic field is applied, foaming can be performed prior to casting; during casting; after casting and before exposure to the magnetic field; or after casting and during exposure to the magnetic field, and the layer is exposed to a magnetic field at a strength and for a time effective to substantially align the electrically conductive particles in isolated columns extending from a first surface of the layer to an opposite, second surface. The foam can be left uncured during exposure to the magnetic field; it can be partially cured prior to exposure to the magnetic field; it can be partially cured during exposure to the magnetic field; it can be fully cured during exposure to the magnetic field; or it can be fully cured following exposure to the magnetic field. In one embodiment, the foam is partially cured prior to exposure to the magnetic field, and fully cured during exposure to the magnetic field. In another embodiment, the foam is partially cured prior to or during exposure to the magnetic field, and fully cured after exposure to the magnetic field.

Magnetic field strengths suitable for particle alignment depend on a variety of factors, including the viscosity of the foam, foam thickness, density, and the nature of the particle. In one embodiment, a higher magnetic field strength is advantageous for thinner foams. In one embodiment, the magnetic field strength has a magnetic flux density of about 50 to about 2000 Gauss, specifically, about 100 to about 1500 Gauss, and more specifically about 125 to about 1200 Gauss.

In one embodiment, the magnetic field is aligned with the layer such that the magnetic, electrically conductive particles are organized into columns that are perpendicular to the x and y axis of the foam, that is, aligned along the z-axis, as a result of application of a magnetic field perpendicular to the first and second surfaces of the layer.

Referring to FIG. 2A, the electrically conductive foam 40 is formed on a substrate 42 that comprises a removable layer 44 disposed on a heat stable carrier 46. The magnetic, electrically conductive, particles 48 are organized into columns 50 that are aligned on an incline relative to the z-axis as a result of application of a magnetic field at an angle of incline relative to the z-direction of desired conductivity transverse to the x-y plane of the polymer foam. Of course, the particles can be any shape that provides for surface exposure and embedding into the removable layer 44. Further, FIGS. 2A-2C shows the foam comprising a multiplicity of cells between the first surface and the second opposite surface. In another embodiment, a single cell can span the first surface and the opposite second surface. A first end 56 opposite the second end 52 of the columns 50 are minimally exposed at the first surface 58 adjoining the removable layer 42. A second end 52 of the columns 50 are more exposed at the second surface 54 of the foam 40

Referring now to FIG. 2B, the foam 40 has not yet fully cured. The removable layer 42 is exposed, for example, to heat at a temperature and for a time effective to allow the removable layer 42 to soften and allow the first ends 56 of the columns 50 adjoining the removable layer 42 to migrate and embed into the layer 42. The migration of the particles and embedding into the removable layer can be enhanced by forces such as gravity, further application of a magnetic field at an angle of incline or perpendicular relative to the z-direction of desired conductivity transverse to the x-y plane of the polymer foam, and chemical forces such as ionic interactions. The result is that first ends 56 embed into the removable layer 44.

As shown in FIG. 2C, the substrate comprising the carrier 46 and removable layer 42 is removed. The foam 40 now has the first ends 56 of the columns 50 more exposed at the first surface 58.

In any of the foregoing embodiments, the removable layer can be used as a release carrier, or disposed on a release carrier, for example a heat-stable carrier such as a polyethylene terephthalate film. Suitable release carriers include, by way of example polyethylene, polypropylene, oriented polypropylene, polyimide, polyester, polyamide, polyvinyl chloride, and polyester films. In a preferred embodiment, a PET carrier is used.

Further, in any of the foregoing embodiments, more than one removable layer can be utilized. For example, referring to FIGS. 1A and 1B, the polymer foam 60 can be disposed in between two removable layers. After the foam layer has partially or fully cured, the two removable layers can be removed so as to more fully expose the conductive particles on the first and second surface. Additionally, the removable layer can have any size or shape and be of any material that has the required physical and chemical properties including planar and non-planar shapes (e.g., corrugated with triangular, sinusoidal, or square flutes).

The removable layer comprises a material that allows embedding of the conductive particles as described above, together with ready removal from the polymer foam. Exemplary materials include meltable compositions having a softening temperature or a melting temperature that is the same as or lower than the curing temperature of a thermosetting foam, or lower than the softening or melting temperature of a thermoplastic foam. Certain materials presently used as low-tack adhesives can be used. Suitable adhesives include adhesives that soften and/or melt under suitable heating conditions when an effective amount of heat is applied so as to allow the ends of the particles adjoining the adhesive to embed into the adhesive. Further, such adhesives are able to re-solidify and are readily removable. A blend of adhesives can be used. A blend of adhesive can allow for compensation for physical and chemical disparities such as for example, thermal expansion values of the foam or carrier. Further, more than one layer and/or patterns of an adhesive can used. Even further, comprises disposing the removable layer on a carrier film such as PET. Suitable adhesives on PET carrier films include, by way of example ESM-3815 from ESD Korea, Co., Ltd., AS 70408TP-PET from Scapa N.A., and Lohmamont MP6001B from Lohmann GmbH & Co.

The removable layer can further include waxes such as those selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof. Selection of suitable waxes is based on formulations that soften and/or melt under suitable heating conditions when an effective amount of heat is applied so as to allow the ends of the particles adjoining the wax to embed into the wax. Preferable waxes are able to re-solidify and are readily removable.

The thickness of the removable layer depends on variables such as the average length or diameter of the conductive particles. The adhesive layer can be of varying thicknesses as needed or required for a specific foam assembly. On one hand, when the thickness of the removable layer is greater than the average length of the particles in the foam, the particles can migrate and penetrate too far into the removable layer so as decouple from the foam when the removable layer is removed. On the other hand, when the thickness of the removable layer is much less than the average length of the particles, there is less surface contact of the particles.

Further any of the foregoing embodiments, the surfaces of the polymer foam are substantially flat. A smooth surface provides improved sealing in gasket applications. In a specific embodiment each surface of the foam is substantially free of protrusions or indentations that arise from the presence of the aligned filler particles. More specifically, the first and second surfaces of the foam are substantially free of protrusions or indentations that arise from alignment of the filler particles and that alter the surface of the x and y surfaces. Thus the ends of the particles formerly adjoining the removable layer can be adjusted to be even with the first surface, or to project from the first surface by an average of about 5% to about 70% of the average particle length, specifically about 10% to about 50% of the particle length, more specifically about 20 to about 40% of the average particle length. The degree of exposure of the conductive particles can be affected by the length of time the particles are allowed to migrate, the viscosity of the removable layer, the strength of the applied magnetic field and similar considerations. It is also possible to increase the degree of exposure by conducting an additional abrading step. As used herein, the term "abrade" includes any process to wear off or remove a surface, such as chemical etching, mechanical grinding, and laser ablation. Alternatively, or in addition, a high tack adhesive can be used to remove a thin layer of the foam surface either during curing or after curing, in order to further expose the ends of the conductive particles.

In practice, the removable layer/carrier can be played out from supply rolls and ultimately rewound on take-up rolls upon separation from the cured foam. Where a separate carrier is used, the selection of material for the bottom carrier will depend on factors such as the desired degree of support and flexibility, the desired degree of releasability from the cured foam, cost, and the like considerations. Paper, thin sheets of metal such as copper or aluminum, or polymer films such as polyethylene terephthalate, silicone, polycarbonate, PTFE, polyimide, or the like can be used. The material can be coated with a release coating.

A second (top) carrier can be used in addition to the bottom carrier. Foaming the layer and/or applying the magnetic field can be performed before, during, or after disposing the second carrier. In one embodiment, the layer is foamed prior to disposing the second carrier. In another embodiment, the layer is foamed after disposing the second carrier. In yet another embodiment, the magnetic field is applied to the layer after disposing on the second carrier. In a specific embodiment, however, only a single carrier is used.

In one embodiment, the second carrier is coated with a second removable layer or a material intended to be transferred to the surface of the cured foam, for example a polyurethane film that is releasable from the carrier, a pressure sensitive adhesive that is releasable from the carrier, or a conductive adhesive that is releasable from the carrier. A fibrous web or other filler material can be disposed on the surface of the carrier, and thereby become ultimately incorporated into the cured foam. In another embodiment, the foam cures to the second carrier. Thus, the second carrier forms part of the final product, instead of being separated from the foam and being rewound on a take-up roll. For example, the foam can be contacted with a conductive layer such as a copper foil. In a specific embodiment, the copper foil further comprises an elastomer layer comprising conductive particles. The foam is contacted with this elastomer layer to provide an article comprising the conductive layer and the foam, with the elastomer/particle layer disposed therebetween. Alternatively, a conveyor belt can be used as the bottom carrier.

The removable layer(s)/carrier(s) can have a smooth surface or a textured, e.g., matte surface. In a specific embodiment, the removable layer(s)/carrier(s) have a smooth surface. An electrically conductive foam layer prepared using a carrier with a smooth surface will have a substantially smoother surface than an electrically conductive foam layer prepared without a smooth carrier. Specifically, an electrically conductive foam layer prepared using a removable layer comprising an adhesive disposed on a smooth surface carrier. A smooth surface carrier provides for a smoother surface, lower density, and better sealing for applications such as gasket fittings.

As stated above, the polymer foam comprises electrically conductive particles of a type and in an amount sufficient to impart electrical conductivity to the foam. The electrically conductive particles comprise an electrically conductive material, or both an electrically and magnetically conductive material, which can be the same or different material. Exemplary electrically conductive materials include conductive metals such as gold, silver, nickel, copper, aluminum, chromium, cobalt, iron, and the like, as well as oxides or alloys comprising at least one of the foregoing metals. Suitable magnetic materials include ferromagnetic and paramagnetic materials. Exemplary magnetic materials include iron, nickel, and cobalt, as well as the lanthanide rare earth elements, and the like, and oxides, ceramics, and alloys of at least one of the foregoing magnetic materials. In one embodiment, the magnetic, electrically conductive material is also a non-oxidizing material.

The particles can be wholly formed from the conductive material(s), or the conductive material(s) can be used as a core or a coating, together with, for example, a non-magnetic material, a non-electrically conductive material, or non-magnetic, non-electrically conductive material. For example, an electrically conductive material can be used to coat a core comprising a magnetic material such as an iron particle, or a magnetic and electrically conductive material can be used to coat a non-magnetic, non-electrically conductive material such as glass, including glass microballoons. Silver and nickel coatings are especially useful. Specific magnetic, electrically conductive particles include stainless steel particles, silver-coated nickel particles, silver-coated iron particles, nickel particles, and nickel-coated particles such as nickel-coated aluminum trihydroxide ($Al(OH)_3$, "ATH"), nickel-coated glass particles, and nickel-coated stainless steel particles.

The electrically conductive, or magnetic and electrically conductive material can be deposited on the core particles by coating techniques such as vapor deposition, electroless plating, and the like. In one embodiment, an electroless plating process can be used to deposit nickel onto aluminum trihydroxide. In another embodiment, vapor deposition of nickel carbonyl is used to provide a nickel coating. A sufficient amount of electrically conductive material is coated onto the magnetically conductive particles such that the particles, when used to form composites, impart the desired level of conductivity to the composite, without significantly adversely affecting the desired properties of the polymer. It is not necessary for all of the particles to be coated, or for the coating to completely cover each particle. Particles that are at least substantially coated can therefore be used. For example, in a given batch of particles, at least about 60% of the total surface area of the particles is coated, specifically at least about 70%, more specifically at least about 80%, and even more specifically at least about 90% of the total surface area of the particles is coated. Coating thickness can vary widely. In one embodiment, the thickness of the coating is about 0.004 to about 0.2 mils (about 0.1 to about 5 micrometers), specifically about 0.02 to about 0.1 mils (about 0.526 to about 3 micrometers).

The particles can have a variety of irregular or regular shapes, e.g., spherical, plate-like, columnar, or rod-like. Particles having a combination of different shapes can be used. In a specific embodiment, the polymer foam comprises particles having high aspect ratios (the length of a particle divided by its width). As used herein, the term "high aspect ratio" generally refers particles having a ratio of length to width from about 1.5 to about 500, specifically about 2 to about 100. Exemplary shapes of particles having high aspect ratios include rod-like particles, fibers, whiskers, and the like. While high aspect ratio "particles" may be used in this disclosure, it is to be understood that the term "particles" includes any high aspect ratio shape, including rods, whiskers, fibers, as well as non-high aspect ratio shape varieties of irregular or regular shapes, such as spherical and plate shapes. The high aspect ratio particle size is not particularly limited, and can have, for example, an average longest dimension of about 0.05 to about 1.4 times the thickness of the polymer layer in which the particles are disposed.

Exemplary particles include metal fibers commercially available from Bekhaert®. The Bekhaert® metal fibers contain only metal, and are stainless steel fibers available in a variety of alloys, such as 304, 347, 316L, and the like. The stainless steel fibers have a dimension effective to provide electrical conduction through the polymer foam layer. The average length of the fiber depends on the alloy and fiber diameter. In one embodiment, the metal fibers, specifically the stainless steel fibers, have an average length of 100 to 1000 micrometers, specifically 300 to 800 micrometers, more specifically 516 micrometers, and a maximum length of less than 2000 micrometers, specifically 1,000 to 1500 micrometers, even more specifically 1395 micrometers. The aspect ratio for the metal fibers, specifically the stainless steel fibers, can vary from about 15 to about 25. In one embodiment, the metal, specifically stainless steel, fibers are nickel-coated before being disposed in the polymer foam layer.

The particles can be surface treated to alter their surface characteristics. For example, the particles can be coated with a hydrophobic material to reduce interaction with a polymer precursor composition. An exemplary coating material is a silane (which can be useful for polyurethane composites) or a fluorosilicone (which can be useful for silicone composites). While not wanting to be bound by theory, it is believed that treatment of the particles with a silane or silicone reduces wetting of the particles by one or more components of the precursor formation or the polymer itself. Control of the wetting of the particles can control the formation of a skin over the particles.

Other electrically conductive fillers can additionally be used to attain a desired conductivity, such as carbon black, carbon fibers such as PAN fibers, metal-coated fibers or spheres such as metal-coated glass fibers, metal-coated carbon fibers, metal-coated organic fibers, metal-coated ceramic spheres, metal-coated glass beads and the like, inherently conductive polymers such as polyaniline, polypyrrole, polythiophene in particulate or fibril form, conductive metal oxides such as tin oxide or indium tin oxide, and combinations comprising at least one of the foregoing conductive fillers can also be used. The relative ratio of magnetic, electrically conductive filler to electrically conductive filler can vary widely, depending on the types of filler used and the desired properties of the foam. In general, the filler composition can comprise 50 to 100 weight percent (wt %) magnetic, electrically conductive material and 0 to 50 wt % electrically conductive filler, more specifically 75 to 99 wt. % magnetic, electrically conductive filler and 1 to 25 wt % electrically conductive filler, each based on the total weight of the filler composition.

The relative amount of the conductive particles used in the manufacture of the electrically conductive polymer foam will vary depending on the type of polymer, the type of particles, the intended use, the desired electrical conductivity, foam cell structure, processing characteristics, and similar factors. In one embodiment, the electrically conductive polymer foam comprises a total conductive particle content about 10 to about 90 wt %, specifically about 20 to about 80 wt %, even more specifically, about 30 to about 70 wt %, each based on the total weight of the electrically conductive polymer foam. Alternatively, the amount of conductive particles can be described as a percent of the volume (vol %) of the precursor formulation for the electrically conductive polymer foam prior to foaming. In one embodiment, the foam comprises about 1 to about 30 vol % conductive particles, specifically about 2 to about 20 vol %, more specifically about 3 to about 15 vol % of the polymer foam precursor formulation prior to foaming.

As used herein, a "foam" is a material having a cellular structure and a density of about 5 to about 150 pounds per cubic foot (pcf) (80 to 2402 kilogram per cubic meter (kcm)), specifically less than or equal to about 125 pcf (2002 kcm), more specifically less than or equal to about 100 pcf (1601 kcm), and still more specifically about 10 to about 60 pcf (160 to 961 kcm). Such foams have a void or cellular content of about 20 to about 99%, specifically greater than or equal to about 30%, and more specifically greater than or equal to about 50%, each based upon the total volume of the foam.

Polymers for use in the foams can be selected from a wide variety of thermoplastic resins, blends of thermoplastic resins, or thermosetting resins. Examples of thermoplastic resins that can be used include polyacetals, polyacrylics, styrene acrylonitrile, polyolefins, acrylonitrile-butadiene-styrene, polycarbonates, polystyrenes, polyethylene terephthalates, polybutylene terephthalates, polyamides such as, but not limited to Nylon 6, Nylon 6,6, Nylon 6,10, Nylon 6,12, Nylon 11 or Nylon 12, polyamideimides, polyarylates, polyurethanes, ethylene propylene rubbers (EPR), polyarylsulfones, polyethersulfones, polyphenylene sulfides, polyvinyl chlorides, polysulfones, polyetherimides, polytetrafluoroethylenes, fluorinated ethylene propylenes, polychlorotrifluoroethylenes, polyvinylidene fluorides, polyvinyl fluorides, polyetherketones, polyether etherketones, polyether ketone ketones, and the like, or a combination comprising at least one of the foregoing thermoplastic resins.

Examples of blends of thermoplastic resins that can be used in the polymer foams include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, polyethylene terephthalate/polybutylene terephthalate, styrene-maleic anhydride/acrylonitrile-butadiene-styrene, polyether etherketone/polyethersulfone, styrene-butadiene rubber, polyethylene/nylon, polyethylene/polyacetal, ethylene propylene rubber (EPR), and the like, or a combination comprising at least one of the foregoing blends.

Examples of polymeric thermosetting resins that can be used in the polymer foams include polyurethanes, epoxys, phenolics, polyesters, polyamides, silicones, and the like, or a combination comprising at least one of the foregoing thermosetting resins. Blends of thermosetting resins as well as blends of thermoplastic resins with thermosetting resins can be used.

Other additives known for use in the manufacture of foams can be present in the foam compositions, for example other fillers, such as reinforcing fillers such as woven webs, silica, glass particles, and glass microballoons, fillers used to provide thermal management, or flame retardant fillers or additives. Suitable flame retardants include, for example, a metal hydroxide containing aluminum, magnesium, zinc, boron, calcium, nickel, cobalt, tin, molybdenum, copper, iron, titanium, or a combination thereof, for example aluminum trihydroxide, magnesium hydroxide, calcium hydroxide, iron hydroxide, and the like; a metal oxide such as antimony oxide, antimony trioxide, antimony pentoxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, tungsten oxide, and the like; metal borates such as zinc borate, zinc metaborate, barium metaborate, and the like; metal carbonates such as zinc carbonate, magnesium carbonate, calcium carbonate, barium carbonate, and the like; melamine cyanurate, melamine phosphate, and the like; carbon black, expandable graphite flakes (for example those available from GrafTech International, Ltd. under the tradename GRAFGUARD), and the like; nanoclays; and brominated compounds. Exemplary flame retardant materials are magnesium hydroxides, nanoclays, and brominated compounds. In one embodiment, flame retardance of the polymer foam meets certain Underwriter's Laboratories (UL) standards for flame retardance. For example, the polymer foam has a rating of V-0 under UL Standard 94.

Still other additives that can be present include dyes, pigments (for example titanium dioxide and iron oxide), antioxidants, antiozonants, ultraviolet (UV) stabilizers, conductive fillers, catalysts for cure of the polymer, crosslinking agents, and the like, as well as combinations comprising at least one of the foregoing additives.

As is known in the art, a polymer foam is manufactured from a precursor composition that is mixed prior to or concomitant with foaming. Foaming can be by mechanical frothing or blowing (using chemical or physical blowing agents, or both), or a combination of mechanical frothing and blowing (using chemical or physical blowing agents, or both). Without being bound by theory, it is believed that when chemical and/or physical blowing agents are used, cell formation that occurs after alignment of the columns can disrupt the columns, leading to lower conductivity. Limiting the thickness of the layer of foam as described herein appears to minimize such disruption. When foams are produced by mechanical frothing alone, or when the chemical and/or physical blowing is substantially complete prior to alignment of the particles, it is possible to achieve adequate conductivity. Without being bound by theory, it is believed that the absence of further foaming after casting allows the formation of stable columns. Thus, in one embodiment, a method of manufacturing a polymer foam layer comprises forming a foam layer on a removable layer, the foam layer having a first surface and an opposite second surface, the foam layer comprising a polymer foam precursor composition; and a filler composition comprising a plurality of magnetic, electrically conductive particles; foaming the foam precursor composition to form a plurality of cells in the layer; applying to the layer a magnetic field of a strength and for a time effective to align the magnetic, electrically conductive particles into mutually isolated columns between the first surface and the opposite second surface of the layer; and curing the foamed layer. In this embodiment, the foam is completely or substantially completely frothed and/or blown prior to application of the magnetic field. As used herein, "substantially completely" means that any further foam development does not substantially disrupt column formation or create a foam thickness higher than the height of the columns.

Specific polymers for use in the manufacture of the foams include polyurethane foams and silicone foams. Polyurethane foams are formed from precursor compositions comprising an organic polyisocyanate component, an active hydrogen-containing component reactive with the polyisocyanate component, a surfactant, and a catalyst. The process of forming the foam can use chemical or physical blowing agents, or the foam can be mechanically frothed. For example, one process of forming the foam comprises substantially and uniformly dispersing inert gas throughout a mixture of the above-described composition by mechanical beating of the mixture to form a heat curable froth that is substantially structurally and chemically stable, but workable at ambient conditions; and curing the froth to form a cured foam. In one embodiment, a physical blowing agent is introduced into the froth to further reduce foam density during the crosslinking process. In another embodiment, the polyurethane foam is formed from the reactive composition using only physical or chemical blowing agents, without the use of any mechanical frothing.

Suitable organic polyisocyanates include isocyanates having the general formula:

$$Q(NCO)_i$$

wherein i is an integer of two or more and Q is an organic radical having the valence of i, wherein i has an average value greater than 2. Q can be a substituted or unsubstituted hydrocarbon group that may or may not contain aromatic functionality, or a group having the formula $Q^1$-Z-$Q^1$ wherein $Q^1$ is a $C_{1-36}$ alkylene or $C_{6-36}$ arylene group and Z is —O—, —O-$Q^2$-O—, —CO—, —S—, —S-$Q^2$-S—, —SO—, —$SO_2$—, $C_{1-24}$ alkylene or $C_{6-24}$ arylene. Examples of such polyisocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl) methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case $Q(NCO)_i$ is a composition known as a prepolymer. Such prepolymers are formed by reacting a stoichiometric excess of a polyisocyanate as above with an active hydrogen-containing component, especially the polyhydroxyl-containing materials or polyols described below. In one embodiment, the polyisocyanate is employed in proportions of about 30 percent to about 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component can comprise polyether polyols and polyester polyols. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Suitable dicarboxylic acids and derivatives of dicarboxylic acids which are useful for producing polycondensation polyester polyols are aliphatic or cycloaliphatic dicarboxylic acids such as glutaric, adipic, sebacic, fumaric and maleic acids; dimeric acids; aromatic dicarboxylic acids such as, but not limited to phthalic, isophthalic and terephthalic acids; tribasic or higher functional polycarboxylic acids such as pyromellitic acid; as well as anhydrides and second alkyl esters, such as, but not limited to maleic anhydride, phthalic anhydride and dimethyl terephthalate.

Additional active hydrogen-containing components are the polymers of cyclic esters. Suitable cyclic ester monomers include, but are not limited to δ-valerolactone, ε-caprolactone, zeta-enantholactone, the monoalkyl-valerolactones, e.g., the monomethyl-, monoethyl-, and monohexyl-valerolactones. Suitable polyester polyols include caprolactone based polyester polyols, aromatic polyester polyols, ethylene glycol adipate based polyols, and mixtures comprising any one of the foregoing polyester polyols. Exemplary polyester polyols are polyester polyols made from ε-caprolactones, adipic acid, phthalic anhydride, terephthalic acid, or dimethyl esters of terephthalic acid.

The polyether polyols are obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy)methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Exemplary alkylene oxides are propylene oxide and mixtures of propylene oxide with ethylene oxide. The polyols listed above can be used per se as the active hydrogen component.

A suitable class of polyether polyols is represented generally by the following formula

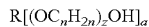

wherein R is hydrogen or a polyvalent hydrocarbon radical; a is an integer (i.e., 1 or 2 to 6 to 8) equal to the valence of R, n in each occurrence is an integer from 2 to 4 inclusive (specifically 3) and z in each occurrence is an integer having a value of from 2 to about 200, specifically from 15 to about 100. In one embodiment, the polyether polyol comprises a mixture of one or more of dipropylene glycol, 1,4-butanediol, 2-methyl-1,3-propanediol, or the like, or combinations comprising at least one of the foregoing polyether polyols.

Other types of active hydrogen-containing materials that can be used are polymer polyol compositions obtained by polymerizing ethylenically unsaturated monomers in a polyol. Suitable monomers for producing such compositions include acrylonitrile, vinyl chloride, styrene, butadiene, vinylidene chloride, and other ethylenically unsaturated monomers. The polymer polyol compositions comprise greater than or equal to about 1, specifically greater than or equal to about 5, and more specifically greater than or equal to about 10 wt % monomer polymerized in the polyol where the weight percent is based on the total amount of polyol. In one embodiment, the polymer polyol compositions comprise less than or equal to about 70, specifically less than or equal to about 50, more specifically less than or equal to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates, and azo compounds.

The active hydrogen-containing component can also contain polyhydroxyl-containing compounds, such as hydroxyl-terminated polyhydrocarbons, hydroxyl-terminated polyformals, fatty acid triglycerides, hydroxyl-terminated polyesters, hydroxymethyl-terminated perfluoromethylenes, hydroxyl-terminated polyalkylene ether glycols hydroxyl-terminated polyalkylenearylene ether glycols, and hydroxyl-terminated polyalkylene ether triols.

The polyols can have hydroxyl numbers that vary over a wide range. In general, the hydroxyl numbers of the polyols, including other cross-linking additives, if employed, are present in an amount of about 28 to about 1000, and higher, specifically about 100 to about 800. The hydroxyl number is defined as the number of milligrams of potassium hydroxide used for the complete neutralization of the hydrolysis product of the fully acetylated derivative prepared from 1 gram of polyol or mixtures of polyols with or without other cross-linking additives. The hydroxyl number can also be defined by the equation:

$$OH = \frac{56.1 \times 1000 \times f}{M.W.}$$

wherein OH is the hydroxyl number of the polyol, f is the average functionality, that is the average number of hydroxyl groups per molecule of polyol, and M.W. is the average molecular weight of the polyol.

Where used, a large number of suitable blowing agents or a mixture of blowing agents are suitable, particularly water. The water reacts with the isocyanate component to yield $CO_2$ gas, which provides the additional blowing necessary. In one embodiment when water is used as the blowing agent, the curing reaction is controlled by selectively employing catalysts. In one embodiment, compounds that decompose to liberate gases (e.g., azo compounds) can also be used.

Especially suitable blowing agents are physical blowing agents comprising hydrogen atom-containing components, which can be used alone or as mixtures with each other or with another type of blowing agent such as water or azo compounds. These blowing agents can be selected from a broad range of materials, including hydrocarbons, ethers, esters and partially halogenated hydrocarbons, ethers and esters, and the like. Suitable physical blowing agents have a boiling point between about −50° C. and about 100° C., and specifically between about −50° C. and about 50° C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFC's (halo fluoroethers) such as methyl-1,1,1-trifluoroethylether and difluoromethyl-1,1,1-trifluoroethylether; and the hydrocarbons such as n-pentane, isopentane, and cyclopentane.

When used, the blowing agents including water generally comprise greater than or equal to 1, specifically greater than or equal to 5 weight percent (wt %) of the polyurethane liquid phase composition. In one embodiment, the blowing agent is present in an amount of less than or equal to about 30, specifically less than or equal to 20 wt % of the polyurethane liquid phase composition. When a blowing agent has a boiling point at or below ambient temperature, it is maintained under pressure until mixed with the other components.

Suitable catalysts used to catalyze the reaction of the isocyanate component with the active hydrogen-containing component include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, 1,3,5-tris(N,N-dimethylaminopropyl)-s-hexahydrotriazine, o- and p-(dimethylaminomethyl)phenols, 2,4,6-tris(dimethylaminomethyl)phenol, N,N-dimethylcyclohexylamine, pentamethyldiethylenetriamine, 1,4-diazobicyclo [2.2.2]octane, N-hydroxyl-alkyl quaternary ammonium carboxylates and tetramethylammonium formate, tetramethylammonium acetate, tetramethylammonium 2-ethylhexanoate and the like, as well as compositions comprising any one of the foregoing catalysts.

In one embodiment, the catalyst comprises a metal acetyl acetonate. Suitable metal acetyl acetonates include metal acetyl acetonates based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. An exemplary catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine)diacetyl acetylacetonato nickel, and the like. Ferric acetylacetonate (FeAA) is also a suitable catalyst, due to its relative stability, good catalytic activity, and lack of toxicity. In one embodiment, the metal acetylacetonate is conveniently added by predissolution in a suitable solvent such as dipropylene glycol or other hydroxyl containing components which will then participate in the reaction and become part of the final product.

In one method of producing the polyurethane foams, the components for producing the foams, i.e., the isocyanate component, the active hydrogen-containing component, surfactant, catalyst, optional blowing agents, electrically conductive, flame retardant filler and other additives are first mixed together then subjected to mechanical frothing with air. Alternatively, the ingredients can be added sequentially to the liquid phase during the mechanical frothing process. The gas phase of the froths is most specifically air because of its cheapness and ready availability. However, if desired, other gases can be used which are gaseous at ambient conditions and which are substantially inert or non-reactive with any component of the liquid phase. Such other gases include, for example, nitrogen, carbon dioxide, and fluorocarbons that are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation specifically is conducted at pressures not greater than 7 to 14 kg/cm$^2$ (100 to 200 pounds per square inch (psi)). Readily available mixing equipment can be used and no special equipment is generally necessary. The amount of inert gas beaten into the liquid phase is controlled by gas flow metering equipment to produce a froth of the desired density. The mechanical beating is conducted over a period of a few seconds in an Oakes mixer, or about 3 to about 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., about 10° C. to about 40° C.

After frothing, the reactive mixture is transferred at a controlled rate through a hose or other conduit to be deposited onto a first carrier. For convenience, this first carrier can be referred to as "bottom carrier," and is generally a moving support that can or cannot readily release the cured foam. A second carrier, also referred to herein as a "surface protective layer" or "top carrier," can be placed on top of the froth. The top carrier is also a moving support that also can or cannot readily release from the cured foam. The top carrier can be applied almost simultaneously with the froth. Before applying the top carrier, the foam can be spread to a layer of desired thickness by a doctoring blade or other suitable spreading device. Alternatively, placement of the top carrier can be used to spread the foam and adjust the frothed layer to the desired thickness. In still another embodiment, a coater can be used after placement of the top carrier to adjust the height of the foam. After application of the top carrier, the frothed foam is blown under the influence of a physical or chemical blowing agent. In one embodiment, the carriers impart a substantially flat surface to the surface of the foam. In one embodiment, the entire assembly is then placed in a magnet and oven to both align the particles and cure the polymer foam.

The assembly of the carrier and foam layer (after optional blowing) is delivered to a heating zone and magnetic field for aligning the electrically conductive particles and curing the foam. The temperatures are maintained in a range suitable for curing the foam, for example at about 90° C. to about 220° C., depending on the composition of the foam material. Differential temperatures can be established for purposes of forming an integral skin on an outside surface of the foam or for adding a relatively heavy layer to the foam.

After the foam is heated and cured, it can then be passed to a cooling zone where it is cooled by any suitable cooling device such as fans. Where appropriate, the carriers are removed and the foam can be taken up on a roll. Alternatively, the foam can be subjected to further processing, for example lamination (bonding using heat and pressure) to the carrier layer.

In a specific embodiment, a method of manufacturing a polymer foam comprises frothing a liquid composition comprising a polyisocyanate component, an active hydrogen-containing component reactive with the polyisocyanate component, a surfactant, a catalyst, and a filler composition comprising a plurality of magnetic, electrically conductive particles; casting the froth on a removable layer to form a polymer layer having a first surface adjoining the removable layer and an opposite second surface; and exposing the polymer layer to a magnetic field to align the magnetic, electrically conductive particles into mutually isolated columns that essentially continuously span the layer between the first surface and the second surface and embed into the removable layer; and curing the layer to produce a polyurethane foam having a density of about 1 to about 125 pounds per cubic foot, an elongation of greater than or equal to about 20%, and a compression set of less than or equal to about 30%. This method can further comprise partially curing the layer prior to fully curing the layer, wherein the magnetic field is applied after partially curing the layer. Even further, the removable layer can be removed so as to as to expose the electrically conductive particles at the first surface. Even further, this method comprises disposing the removable layer on a carrier.

In another specific embodiment, a method of manufacturing a polymer foam layer comprises: (a) forming a precursor layer comprising a polymer foam precursor composition, and a filler composition comprising a plurality of magnetic, electrically conductive particles, wherein the precursor layer has a first surface and a second opposite surface, and is formed having the first surface disposed on a first removable layer; (b) foaming the foam precursor composition to form a foamed layer, wherein the foamed layer has a plurality of cells; (c) applying to the foamed layer a magnetic field of a strength and for a time effective to align the magnetic, electrically conductive particles into mutually isolated columns having a first end and a second end, wherein the particles essentially continuously span the foam layer between the first surface and the opposite second surface; (d) curing the foamed layer; and (e) prior to or during curing, exposing the first removable layer to heat at a temperature and for a time effective to allow the first ends of the columns adjacent to the first removable layer to partially embed in the first removable layer. This method can further comprise (f) prior to or during curing, disposing a second removable layer on the second surface of the polymer foam layer; and (g) prior to or during curing, exposing the second removable layer to heat at a temperature and for a time effective to allow the second ends of the columns adjacent to the second removable layer to partially embed in the second removable layer. This method can further comprise removing the first and/or second removable layers to expose the first and/or second ends of the columns. Even further, this method can comprise disposing the removable layer(s) on a carrier.

In another specific embodiment, a method of manufacturing a polymer foam layer comprises (a) forming a precursor layer comprising a polymer foam precursor composition, and a filler composition comprising a plurality of electrically and/or magnetically conductive particles, wherein the precursor layer has a first surface and a second opposite surface, and is formed having the first surface disposed on a first removable layer; (b) foaming the foam precursor composition to form a foam layer, wherein the foamed layer has a plurality of cells; (c) curing the foamed layer; and (d) prior to or during curing, exposing the first removable layer to heat at a temperature and for a time effective to allow the electrically and/or magnetically conductive particles to partially embed in the first removable layer. Even further, this method can comprise (e) prior to or during curing, disposing a second removable layer on the second surface of the polymer foam layer, and (g) prior to or during curing, exposing the second removable layer to heat at a temperature and for a time effective to allow the electrically and/or magnetically conductive particles to partially embed in the second removable layer. The method can further comprise prior to or during curing, applying to the foamed layer a magnetic field of a strength and for a time effective to align the electrically and/or magnetically conductive particles into pathways that essentially continuously span the polymer foam between the first surface and the opposite second surface having a first end and a second end. Even further, this method can comprise removing the first and/or second removable layer to expose the conductive particles. Further still, this method can comprise disposing the removable layer(s) on a carrier.

In one embodiment, the electrically conductive polyurethane foam has mechanical properties similar to those of the same polyurethane foam without the coated flame retardant particles. If auxiliary blowing agents are employed, the resultant foam can have a bulk density as low as about 1 pcf.

Silicone foams comprising a polysiloxane polymer and electrically conductive particles can also be used.

In an embodiment, a method of manufacturing a silicone foam comprises (a) spreading or extruding a mixture onto a first removable layer, the mixture comprising a polysiloxane polymer having hydride substituents, a blowing agent, a platinum based catalyst, and a filler composition comprising a plurality of magnetic, electrically conductive particles; and (b) blowing and curing the mixture in an applied magnetic field to align the magnetic, electrically conductive, particles into mutually isolated pathways that essentially continuously span the foam between a first surface and a second opposite surface of the foam and partially embed into the first removable layer, wherein the first surface of the foam adjoins the first removable layer. Even further, this method can comprise (c) prior to or during curing, disposing a second removable layer on the foam, wherein the second surface of the foam adjoins the second removable layer, and (d) prior to or during curing, applying the magnetic field in order to partially embed the magnetic, electrically conductive particles into the second removable layer.

In an embodiment, the silicone foams are produced as a result of the reaction between water and hydride groups in a polysiloxane polymer precursor composition with the consequent liberation of hydrogen gas. This reaction is generally catalyzed by a noble metal, specifically a platinum catalyst. In one embodiment, the polysiloxane polymer has a viscosity of about 100 to 1,000,000 poise at 25° C. and has chain substituents selected from the group consisting of hydride, methyl, ethyl, propyl, vinyl, phenyl, and trifluoropropyl. The end groups on the polysiloxane polymer can be hydride, hydroxyl, vinyl, vinyl diorganosiloxy, alkoxy, acyloxy, allyl, oxime, aminoxy, isopropenoxy, epoxy, mercapto groups, or other known, reactive end groups. Suitable silicone foams can also be produced by using several polysiloxane polymers, each having different molecular weights (e.g., bimodal or trimodal molecular weight distributions) as long as the viscosity of the combination lies within the above specified values. It is also possible to have several polysiloxane base polymers with different functional or reactive groups in order to produce the desired foam. In one embodiment, the polysiloxane polymer comprises about 0.2 moles of hydride (Si—H) groups per mole of water.

Depending upon the chemistry of the polysiloxane polymers used, a catalyst, generally platinum or a platinum-containing catalyst, can be used to catalyze the blowing and the curing reaction. The catalyst can be deposited onto an inert carrier, such as silica gel, alumina, or carbon black, or on a removable layer as disclosed herein. In one embodiment, an unsupported catalyst selected from among chloroplatinic acid, its hexahydrate form, its alkali metal salts, and its complexes with organic derivatives is used. Exemplary catalysts are the reaction products of chloroplatinic acid with vinylpolysiloxanes such as 1,3-divinyltetramethyldisiloxane, which are treated or otherwise with an alkaline agent to partly or completely remove the chlorine atoms; the reaction products of chloroplatinic acid with alcohols, ethers, and aldehydes;

and platinum chelates and platinous chloride complexes with phosphines, phosphine oxides, and with olefins such as ethylene, propylene, and styrene. It can also be desirable, depending upon the chemistry of the polysiloxane polymers to use other catalysts such as dibutyl tin dilaurate in lieu of platinum based catalysts.

Various platinum catalyst inhibitors can also be used to control the kinetics of the blowing and curing reactions in order to control the porosity and density of the silicone foams. Examples of such inhibitors include polymethylvinylsiloxane cyclic compounds and acetylenic alcohols. These inhibitors should not interfere with the foaming and curing in such a manner that destroys the foam.

Physical or chemical blowing agents can be used to produce the silicone foam, including the physical and chemical blowing agents listed above for polyurethanes. Other examples of chemical blowing agents include benzyl alcohol, methanol, ethanol, isopropyl alcohol, butanediol, and silanols. In one embodiment, a combination of methods of blowing is used to obtain foams having desirable characteristics. For example, a physical blowing agent such as a chlorofluorocarbon can be added as a secondary blowing agent to a reactive mixture wherein the primary mode of blowing is the hydrogen released as the result of the reaction between water and hydride substituents on the polysiloxane.

In the production of silicone foams, the reactive components of the precursor composition are stored in two packages, one containing the platinum catalyst and the other the polysiloxane polymer containing hydride groups, which prevents premature reaction. It is possible to include the electrically conductive particles in either package. In another method of production, the polysiloxane polymer is introduced into an extruder along with the electrically conductive particles, water, physical blowing agents if necessary, and other desirable additives. The platinum catalyst is then metered into the extruder to start the foaming and curing reaction. The use of physical blowing agents such as liquid carbon dioxide or supercritical carbon dioxide in conjunction with chemical blowing agents such as water can give rise to foam having much lower densities. In yet another method, the liquid silicone components are metered, mixed and dispensed into a device such a mold or a continuous coating line. The foaming then occurs either in the mold or on the continuous coating line.

In one embodiment, the entire assembly comprising the platinum catalyst, the polysiloxane polymer containing hydride groups, electrically conductive particles, physical, and/or chemical blowing agents, optional platinum catalyst inhibitors, and other desired additives are placed in a magnetic field. Foaming can occur before or during exposure to the magnetic field.

The electrically conductive silicone foams can have mechanical properties that are the same or substantially similar to those of the same silicone foams without the electrically conductive particles.

Alternatively, a soft, electrically conductive silicone composition can be formed by the reaction of a precursor composition comprising a liquid silicone composition comprising a polysiloxane having at least two alkenyl groups per molecule; a polysiloxane having at least two silicon-bonded hydrogen atoms in a quantity effective to cure the composition; a catalyst; and optionally a reactive or non-reactive polysiloxane fluid having a viscosity of about 100 to about 1000 centipoise. Suitable reactive silicone compositions are low durometer, 1:1 liquid silicone rubber (LSR) or liquid injection molded (LIM) compositions. Because of their low inherent viscosity, the use of the low durometer LSR or LIM facilitates the addition of higher filler quantities, and results in formation of a soft foam.

The reactive or non-reactive polysiloxane fluid allows higher quantities of filler to be incorporated into the cured silicone composition, thus lowering the obtained volume and surface resistivity values. In one embodiment, the polysiloxane fluid remains within the cured silicone and is not extracted or removed. The reactive silicone fluid thus becomes part of the polymer matrix, leading to low outgassing and little or no migration to the surface during use. In one embodiment, the boiling point of the non-reactive silicone fluid is high enough such that when it is dispersed in the polymer matrix, it does not evaporate during or after cure, and does not migrate to the surface or outgas.

In one embodiment, LSR or LIM systems are provided as two-part formulations suitable for mixing in ratios of about 1:1 by volume. The "A" part of the formulation comprises one or more polysiloxanes having two or more alkenyl groups and has an extrusion rate of less than about 500 g/minute. Suitable alkenyl groups are exemplified by vinyl, allyl, butenyl, pentenyl, hexenyl, and heptenyl, with vinyl being particularly suitable. The alkenyl group can be bonded at the molecular chain terminals, in pendant positions on the molecular chain, or both. Other silicon-bonded organic groups in the polysiloxane having two or more alkenyl groups are exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The alkenyl-containing polysiloxane can have straight chain, partially branched straight chain, branched-chain, or network molecule structure, or can be a mixture of two or more selections from polysiloxanes with the exemplified molecular structures. The alkenyl-containing polysiloxane is exemplified by trimethylsiloxy-endblocked dimethylsiloxane-methylvinylsiloxane copolymers, trimethylsiloxy-endblocked methylvinylsiloxane-methylphenylsiloxane copolymers, trimethylsiloxy-end blocked dimethylsiloxane-methylvinylsiloxane-methylphenylsiloxane copolymers, dimethylvinylsiloxy-endblocked dimethylpolysiloxanes, dimethylvinylsiloxy-endblocked methylvinylpolysiloxanes, dimethylvinylsiloxy-endblocked methylvinylphenylsiloxanes, dimethylvinylsiloxy-endblocked dimethylvinylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-diphenylsiloxane copolymers, polysiloxane comprising $R_3SiO_{1/2}$ and $SiO_{4/2}$ units, polysiloxane comprising $RSiO_{3/2}$ units, polysiloxane comprising the $R_2SiO_{2/2}$ and $RSiO_{3/2}$ units, polysiloxane comprising the $R_2SiO_{2/2}$, $RSiO_{3/2}$ and $SiO_{4/2}$ units, and a mixture of two or more of the preceding polysiloxanes. R represents substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl, with the proviso that at least 2 of the R groups per molecule are alkenyl.

The "B" component of the LSR or LIM system comprises one or more polysiloxanes that contain at least two silicon-bonded hydrogen atoms per molecule and has an extrusion rate of less than about 500 g/minute. The hydrogen can be bonded at the molecular chain terminals, in pendant positions on the molecular chain, or both. Other silicon-bonded groups are organic groups exemplified by non-alkenyl, substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The hydrogen-containing polysiloxane component can have straight-chain, partially branched straight-chain, branched-chain, cyclic, network molecular structure, or can be a mixture of two or more selections from polysiloxanes with the exemplified molecular structures. The hydrogen-containing polysiloxane is exemplified by trimethylsiloxy-endblocked methylhydrogenpolysiloxanes, trimethylsiloxy-endblocked dimethylsiloxane-methylhydrogensiloxane copolymers, trimethylsiloxy-endblocked methylhydrogensiloxane-methylphenylsiloxane copolymers, trimethylsiloxy-endblocked dimethylsiloxane-methylhydrogensiloxane-methylphenylsiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxanes-methylhydrogensiloxane copolymers, dimethylhydrogensiloxy-endblocked dimethylsiloxane-methylphenylsiloxane copolymers, and dimethylhydrogensiloxy-endblocked methylphenylpolysiloxanes.

The hydrogen-containing polysiloxane component is added in an amount sufficient to cure the composition, specifically in a quantity of about 0.5 to about 10 silicon-bonded hydrogen atoms per alkenyl group in the alkenyl-containing polysiloxane.

The silicone composition further comprises, generally as part of Component "A," a catalyst such as platinum to accelerate the cure. Platinum and platinum compounds known as hydrosilylation-reaction catalysts can be used, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of a platinum addition-reaction catalyst, as described above, in a thermoplastic resin such as methyl methacrylate, polycarbonate, polystyrene, silicone, and the like. Mixtures of catalysts can also be used. A quantity of catalyst effective to cure the present composition is generally from 0.1 to 1,000 parts per million (by weight) of platinum metal based on the combined amounts of alkenyl and hydrogen components.

The composition optionally further comprises one or more polysiloxane fluids having a viscosity of less than or equal to about 1000 centipoise, specifically less than or equal to about 750 centipoise, more specifically less than or equal to about 600 centipoise, and most specifically less than or equal to about 500 centipoise. The polysiloxane fluids can also have a viscosity of greater than or equal to about 100 centipoises. The polysiloxane fluid component is added for the purpose of decreasing the viscosity of the composition, thereby allowing at least one of increased filler loading, enhanced filler wetting, and enhanced filler distribution, and resulting in cured compositions having lower resistance and resistivity values. Use of the polysiloxane fluid component can also reduce the dependence of the resistance value on temperature, and/or reduce the timewise variations in the resistance and resistivity values. Use of the polysiloxane fluid component obviates the need for an extra step during processing to remove the fluid, as well as possible outgassing and migration of diluent during use. The polysiloxane fluid should not inhibit the curing reaction, that is, the addition reaction, of the composition, but it may or may not participate in the curing reaction.

The non-reactive polysiloxane fluid has a boiling point of greater than about 500° F. (260° C.), and can be branched or straight-chained. The non-reactive polysiloxane fluid comprises silicon-bonded non-alkenyl organic groups exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups. Thus, the non-reactive polysiloxane fluid can comprise $R_3SiO_{1/2}$ and $SiO_{4/2}$ units, $RSiO_{3/2}$ units, $R_2SiO_{2/2}$ and $RSiO_{3/2}$ units, or $R_2SiO_{2/2}$, $RSiO_{3/2}$ and $SiO_{4/2}$ units, wherein R represents substituted and unsubstituted monovalent hydrocarbon groups selected from the group consisting of alkyl, methyl, ethyl, propyl, butyl, pentyl, hexyl, aryl, phenyl, tolyl, xylyl, aralkyl, benzyl, phenethyl, halogenated alkyl, 3-chloropropyl, and 3,3,3-trifluoropropyl. Because the non-reactive polysiloxane is a fluid and has a significantly higher boiling point (greater than about 230° C. (500° F.)), it allows the incorporation of higher quantities of filler, but does not migrate or outgas. Examples of non-reactive polysiloxane fluids include DC 200 from Dow Corning Corporation.

Reactive polysiloxane fluids co-cure with the alkenyl-containing polysiloxane and the polysiloxane having at least two silicon-bonded hydrogen atoms, and therefore can themselves contain alkenyl groups or silicon-bonded hydrogen groups. Such compounds can have the same structures as described above in connection with the alkenyl-containing polysiloxane and the polysiloxane having at least two silicon-bonded hydrogen atoms, but in addition have a viscosity of less than or equal to about 1000 centipoise (cps), specifically less than or equal to about 750 cps, more specifically less than or equal to about 600 cps, and most specifically less than or equal to about 500 cps. In one embodiment, the reactive polysiloxane fluids have a boiling point greater than the curing temperature of the addition cure reaction.

The polysiloxane fluid component is present in amount effective to allow the addition, incorporation, and wetting of higher quantities of conductive filler and/or to facilitate incorporation of the electrically conductive particles, for example to facilitate detangling and/or dispersion. In one embodiment, the polysiloxane fluid component is added to the composition in an amount of about 5 to about 50 weight parts per 100 weight parts of the combined amount of the polysiloxane having at least two alkenyl groups per molecule, the polysiloxane having at least two silicon-bonded hydrogen atoms in a quantity effective to cure the composition, and the catalyst. The amount of the polysiloxane fluid component is specifically greater than or equal to about 5, more specifically greater than or equal to about 7.5, and even more specifically greater than or equal to about 10 weight parts. Also desired is a polysiloxane fluid component of less than or equal to about 50 weight parts, more specifically less than or equal to about 25 weight parts, and more specifically less than or equal to about 20 weight parts of the combined amount of the polysiloxane having at least two alkenyl groups per molecule, the polysiloxane having at least two silicon-bonded hydrogen atoms in a quantity effective to cure the composition, and the catalyst.

The silicone foams can further optionally comprise a curable silicone gel formulation. Silicone gels are lightly cross-linked fluids or under-cured elastomers. They are unique in that they range from very soft and tacky to moderately soft and only slightly sticky to the touch. Use of a gel formulation decreases the viscosity of the composition, thereby allowing at least one of an increased filler loading, enhanced filler wetting, and/or enhanced filler distribution, thereby resulting in cured compositions having lower resistance and resistivity values and increased softness. Suitable gel formulations can be either two-part curable formulations or one-part formulations. The components of the two-part curable gel formulations is similar to that described above for LSR systems (i.e., an organopolysiloxane having at least two alkenyl groups per molecule and an organopolysiloxane having at least two silicon-bonded hydrogen atoms per molecule). The main difference lies in the fact that no filler is present, and that the molar ratio of the silicon-bonded hydrogen groups (Si—H) groups to the alkenyl groups is usually less than one, and can be varied to create an "under-cross linked" polymer with the looseness and softness of a cured gel. Specifically, the ratio of silicone-bonded hydrogen atoms to alkenyl groups is less than or equal to about 1.0, specifically less than or equal to about 0.75, more specifically less than or equal to about 0.6, and most specifically less than or equal to about 0.1. An example of a suitable two-part silicone gel formulation is SYLGARD® 527 gel commercially available from the Dow Corning Corporation.

The silicone foams can be cast on a removable layer described herein, as well as processed using only carrier, or both a removable layer and carrier.

Use of magnetically aligned, electrically conductive particles allows the manufacture of polymer foams that have excellent electrical conductivity using lower levels of electrically conductive filler. Use of lower levels results in the foams having improved physical properties, particularly compression set and/or softness. These characteristics permit the polymer foams to be used as a variety of articles such as gasketing materials, electrical grounding pads, battery contact conductive spring elements and the like, particularly where electromagnetic and/or radio frequency shielding or electrostatic dissipative properties are desired. The materials can be used where sealing, shock absorption, and/or cushioning, together with electrical conductivity is desired. The foam layers could also be used to provide thermal conductivity, if the electrically conductive fillers are also thermally conductive, or if both electrically and thermally conductive fillers are present. In one embodiment, thermally conductive fillers (instead of electrically conductive fillers could be used, to provide a layer with thermal conductivity.

The electrically conductive foams could also be used with or without an electrically conductive layer (e.g., a copper foil) and a patterned, non-electrically conductive adhesive. As is known, non-electrically conductive adhesives are desirable due to their significantly lower cost compared to conductive adhesives. The foregoing article configuration allows an electrical connection between the foam layer and the conductive layer, together with use of a less expensive adhesive. In another embodiment, the formulation of the cured polymer foam is adjusted by known means to provide adhesive properties to the polymer foam. A conductive foam adhesive can be achieved.

Use of the magnetically aligned, electrically conductive particles enables the production of electrically conductive polymer foams having a volume resistivity of about $10^{-3}$ ohm-cm to about $10^3$ ohm-cm at 100 psi pressure. Within this range, the volume resistivity can be less than or equal to about $10^2$, more specifically less than or equal to about 10, and most specifically less than or equal to about 1 ohm-cm.

In an embodiment, the polymer foams provide electromagnetic shielding in an amount of greater than or equal to about 50 decibels (dB), specifically greater than or equal to about 70 dB, even more specifically greater than or equal to about 80 dB. One method of measuring electromagnetic shielding is set forth in MIL-G-83528B.

In a particular embodiment, the volume resistivity of the polymer foam is less than or equal to about 1, and the electromagnetic shielding is greater than or equal to about 80 dB.

In another embodiment, the foam also has at least one the following properties: a 25% compressive force deflection (CFD) of about 0.007 to about 10.5 kg/cm² (about 0.1 to about 150 psi); an elongation to break of greater than or equal to about 20%; a compression set (50%) of less than or equal to about 30%, and a bulk density of about 1 to about 125 pcf.

Modulus as reflected by compression force deflection (CFD) is determined on an Instron using 5×5 centimeter die-cut samples stacked to a minimum of 0.6 centimeters (0.250 inches), usually about 0.9 centimeters (0.375 inches), using two stacks per lot or run, and a 9090 kg (20,000 pound) cell mounted in the bottom of the Instron. CFD was measured by calculating the force in pounds per square inch (psi) required to compress the sample to 25% of the original thickness in accordance with ASTM D1056.

Tensile strength and elongation are measured using an Instron fitted with a 20 kilogram (50-pound) load cell and using 4.5-9.0 kilogram range depending on thickness and density. Tensile strength is calculated as the amount of force in kilogram per square centimeter (kg/cm²) at the break divided by the sample thickness and multiplied by two. Elongation is reported as percent extension.

In an embodiment, conductive particles are dispersed throughout the foam so as to form pathways that essentially continuously span the foam layer and embed into a removable layer as disclosed herein. Alternatively, the foam comprises high aspect ratio particles aligned into magnetic, electrically conductive columns within the foam and embed into a removable layer as disclosed herein. Each column consists of a single chain of the magnetic, electrically conductive, high aspect ratio particles that are mutually isolated from the other chains of particles. Good conductivity can be achieved where each chain consists of 1 to 20, specifically 1 to 6 of the magnetic, electrically conductive, high aspect ratio particles. The chains need not be strictly linear, but there is mutual contact between the particles that establishes an electrical path. Use of a high aspect ratio particle can have certain advantages over using spherical or similarly shaped particles without a high aspect ratio. The dimensions of the high aspect ratio particles mean fewer individual particles are required to form a column that spans the thickness of the foam layer. Using the high aspect ratio particles, therefore, reduces the number of interparticle contacts required to form an electrically conductive column. Moreover, a single high aspect ratio particle can have a longest dimension that is equal to or slightly greater than a thickness of the foam in which it is aligned as described above. In such a case, no interparticle contacts are required to form mutually isolated electrically conductive columns. Even further, by utilizing a particle with a length greater than the thickness of the foam layer, good conductivity can still be achieved even if extra foaming occurs after the magnetic alignment is complete. The foam can grow to meet the height of the high aspect ratio particles, without covering the ends of the columns so deeply that it is difficult to have electrical conductivity through the foam. In one embodiment, one or both of the particle ends remain exposed at the surface of the foam layer. In another embodiment, the foam expands to grow just up around the ends of the high aspect ratio particles.

Use of a removable layer is further applicable to polymer foams that do not have the electrically conductive particles aligned into columns, e.g., where the particles are dispersed throughout the foam. In this embodiment, a polymer foam layer contains a plurality of particles that are electrically conductive and optionally magnetically conductive. The foam layer has a first surface and an opposite second surface, and a removable layer is disposed on the second surface of the polymer foam layer. In this embodiment, the electrically conductive particles dispersed in the foam form pathways that essentially span the polymer foam from the first and second surfaces. A portion of the electrically conductive particles are exposed at the first surface of the foam layer and another portion of the electrically conductive particles are partially embedded in the removable layer.

In another embodiment, a polymer foam layer that does not have electrically conductive particles aligned into columns can be manufactured as follows. First, a precursor layer is formed, comprising a polymer foam precursor composition and a filler composition. The filler composition comprises a plurality of particles that are electrically conductive, and optionally magnetically conductive. The precursor layer has a first surface and a second opposite surface, and is formed having the first surface disposed on a removable layer. Next, the precursor layer is foamed to form a foam layer, wherein the foam layer has a plurality of cells and conductive particles. The conductive particles are dispersed throughout the foam layer, wherein the dispersed particles form pathways having a first end that connect from the first surface and a second end that connects to the second surface. The foam layer is cured. Prior to or during curing, the removable layer is exposed to heat at a temperature and for a time effective to allow the conductive particles connected along the pathway to partially embed in the removable layer. Optionally, prior to or during curing, a magnetic field of a strength and for a time effective can be applied to the foam layer in order to further align the dispersed particles, form additional pathways that span the foam layer between the first surface and the opposite second surface, and/or further embed a portion of the conductive particles into the removable layer. It is optional to remove the removable layer once the foam has partially cured or fully cured. Removal of the removable layer exposes the conductive particles. Alternatively, the removable layer can be left on the foam layer during the manufacturing process in order to protect the conductive particles from environmental effects, such as, for example, corrosion, and it can be removed when needed.

In order to provide good mechanical properties to the foam, particularly good sealing properties for a foamed sheet, the average diameter of the cells in the foam is about 20 to about 500 micrometers, preferably about 20 to about 300 micrometer. Optimal cellular diameters of the foam will therefore be a balance between the desired thickness of the foam sheet and the sealing ability desired.

The following examples, which are meant to be exemplary, not limiting, illustrate compositions and methods of manufacturing of some of the various embodiments of the electromagnetically shielding and/or electrostatically dissipative and/or electrically conductive polymer foams described herein.

EXAMPLES

The following test was used to determine conductivity. As is known, particular values for volume resistivity and electrostatic shielding will depend on the particular test methods and conditions. For example, it is known that volume resistivity and shielding effectiveness can vary with the pressure placed on the sample during the test. Useful electrical equipment and test fixtures to measure volume resistivity in the sample below are as follows. The fixture is a custom fabricated press with gold plated, 2.5 cm×2.5 cm (1 inch×1 inch) square, and electrical contacts. The fixture is equipped with a digital force gauge that allows the operator to control and make adjustments to the force that is applied to the surface of the sample. The power supply is capable of supplying 0 to 2 amps to the sample surface. The voltage drop and ohms across the sample are measured using a HP 34420A Nano Volt/Micro Ohmmeter. The electronic components of the fixture are allowed to warm up and, in the case of the HP 34420 A, the internal calibration checks are done. The samples are allowed to equilibrate, for a period of 24 hours, to the conditions of the test environment. Suitable test environment is 50% Relative Humidity (% RH) with a room temp of 23° C. (70° F.). The sample to be tested is placed between the platens of the test fixture and a load is applied to the surface. The applied load is dependent on the type of sample to be tested, soft foams are tested using small loads while solids are tested using a load range from about 63,279 to about 210,930 kilogram per square meter (90 to 300 pounds per square inch). Once the load has been applied, the current is applied to the sample and the voltage drop through the sample thickness is measured. A suitable test would include measurements at 4 different amp settings, 0.5, 1.0, 1.6, and 2.0 amps. For a conductive composite the resulting calculated volume resistivity for all four of the amp settings will be similar. The calculation for the volume resistivity is as follows:

$$\text{Volume resistivity (ohm-cm)} = (E/I)*(A/T)$$

wherein E=voltage drop (V), I=current (amps), A=area ($cm^2$), and T=thickness (cm).

Volume resistivity measurements are similarly made on elastomeric samples by cutting a rectangular sample, coating the ends with silver paint, permitting the paint to dry, and using a voltmeter to make resistance measurements.

Example 1

An evaluation of nickel and nickel-coated ceramic microspheres as conductive fillers in a silicone foam was performed. Silicones (Dow Corning Silicone 8137 and NUSIL 6033 from Nusil Technology LLC), the filler microspheres, and silicone cure inhibitor (1-octyn-3-ol from Aldrich Chemical Co.) were mixed in a Flaktek speed mixer, cast on a PET film with a controlled thickness, and were placed in an oven exposed to an adjustable magnetic field. In general, the chemically blown and cured foams had a thickness of 70 to 80 mils (1778 to 2032 micrometers).

The results in Table 1 show that even under a magnetic field as strong as 1200 Gauss, no conductivity was observed in the thick layers of the cured foam.

TABLE 1

| | Run No. | | | | | | |
|---|---|---|---|---|---|---|---|
| | 1 | 2 | 3 | 4 | 5 | 6 | 7 |
| Magnetic field, Gauss | 250 | 250 | 1000 | 1000 | 1200 | 1200 | 1200 |
| Casting thickness, mil | 10 | 20 | 20 | 20 | 20 | 20 | 20 |
| Oven temperature, ° C. | 23 | 23 | 23 | 23 | 23 | 23 | 23 |
| Oven residence time, min | 5 | 5 | 5 | 5 | 10 | 10 | 10 |
| Top carrier | no | no | no | no | no | no | no |
| Si formulation A/B, gras | 33/3.3 | 33/3.3 | 33/3.3 | 33/3.3 | 33/3.3 | 33/3.3 | 33/3.3 |
| Inhibitor, drops (about 40 mg) | 5 | 4 | 4 | 4 | 3 | — | 2 |
| Filler sphere size, micrometers | 45-75* | 45-75* | <35** | <35** | <100** | <100** | <100** |
| Wt. % Ni in filler | 100 | 100 | 27 | 27 | 10 | 10 | 10 |
| Filler loading, wt. % | 10 | 20 | 10 | 20 | 20 | 20 | 20 |
| Conductivity | no | no | no | no | no | no | no |

*100% nickel microspheres
**Ni-coated ceramic microspheres

Example 2

Table 2 shows the results of additional runs using 100% nickel microspheres. Formulations were cast at a thickness of 18 to 40 mil (457 to 1016 micrometers) to prepare foam samples.

TABLE 2

| | Run No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Magnetic field, Gauss | 1000 | 1000 | 1000 | 1000 | 1000 | 1000 | 1000 | 1000 | 1000 | 1000 | 1000 | 1000 | 1000 |
| Casting thickness, mil | 20 | 20 | 40 | 40 | 40 | 27 | 18 | 18 | 18 | 18 | 18 | 18 | 27 |
| Oven temp, ° C. | 60 | 60 | 60 | 60 | 60 | 60 | 60 | 60 | 60 | 60 | 60 | 60 | 60 |
| Oven residence time, min | 10 | 10 | 5 | 5 | 5 | 5 | 5 | 5 | 5 | 5 | 5 | 5 | 5 |
| With top carrier | no | no | no | yes | yes | yes | yes | yes | yes | yes | yes | yes | yes |
| Si formulation, A/B, gras | 33/3.3 | 33/3.3 | 33/3.3 | 33/3.3 | 33/3.3 | 33/3.3 | 33/3.3 | 33/3.3 | 50/5 | 50/5 | 33/3.3 | 33/3.3 | 33/3.3 |
| Inhibitor, drops (about 40 mg) | 4 | 4 | 4 | 4 | 4 | 4 | 4 | 4 | 6 | 6 | 4 | 4 | 4 |
| Filler sphere size, micrometer | 45-75 | 45-75 | 45-75 | 45-75 | 45-75 | 45-75 | 45-75 | 45-75 | 45-75 | 45-75 | 32-45 | 32-45 | 32-45 |
| Filler loading, grams | 18 | 24 | 30 | 30 | 30 | 30 | 33 | 50 | 55 | 50 | 50 | 60 | 60 |
| Nickel column formation | yes | yes | yes | yes | yes | yes | yes | yes | yes | yes | yes | yes | yes |
| Thickness, mil | 21 | 23 | 55 | 103 | 125 | 98 | 49 | 46 | 46 | 47 | 47 | 41 | 72 |
| Density, PCF | 38.4 | 37.3 | 30.2 | 31 | 26.1 | 22 | 24.7 | 26.9 | 28.3 | 30.8 | 30.8 | 38.1 | 39.9 |
| Conductivity | no | no | no | no | no | no | no | no | no | no | no | no | no |
| Foam quality | poor | poor | poor | good | good | good | good | good | good | good | good | good | good |

In the runs shown in Table 2, filler column formation was observed; however the foams were not conductive. Runs 1-3 were cast without a top carrier, which resulted in foams of poorer quality. Analysis of runs 4-13 showed that the cured foams were 40 to 120 mils (1016 to 3038 micrometers) thick, and had two or more cells spanning the thickness of the foam (z-direction). FIG. 6 is an SEM of the foam of Run No. 11 of Example 3, and FIG. 7 is an SEM of the foam of Run No. 13 of Example 3. As can be seen from the SEM's, discontinuity was observed in individual nickel columns at the interface of the cells in the z-axis direction.

Example 3

Thinner foams were prepared using 100% Ni spheres or silver-coated nickel spheres, both with and without a top carrier as indicated. The premix was cooled in a refrigerator. The results are shown in Table 3A.

TABLE 3A

| | Run No. | | | | | | | |
|---|---|---|---|---|---|---|---|---|
| | 1a | 1b | 2a | 2b | 3a | 3b | 4a | 4b |
| Magnetic field, Gauss | 500 | 500 | 250 | 250 | 250 | 250 | 250 | 250 |
| Casting thickness, mil | 5 | 5 | 5 | 5 | 5 | 5 | 10 | 10 |
| Oven temp, ° C. | 55 | 55 | 55 | 55 | 50 | 50 | 50 | 50 |
| Oven residence time, min | 5 | 5 | 5 | 5 | 5 | 5 | 5 | 5 |
| With top carrier | no | yes | no | yes | no | yes | no | yes |
| Substrate | PET | PET | PET | PET | PET | PET | PET | PET |
| Si formulation A/B, gras | 33/3.3 | 33/3.3 | 33/3.3 | 33/3.3 | 33/3.3 | 33/3.3 | 33/3.3 | 33/3.3 |
| Inhibitor, drops (about 40 mg) | 4 | 4 | 4 | 4 | 4 | 4 | 4 | 4 |
| Filler sphere size, micrometer | 45-75 | 45-75 | 45-75 | 45-75 | 45-75 | 45-75 | 75-90* | 75-90* |
| Filler loading, grams | 48 | 48 | 48 | 48 | 48 | 48 | 48 | 48 |
| Filler column formation | yes | yes | yes | yes | yes | yes | yes | yes |
| Thickness, mil | 8 | 13 | 6 | 13.5 | 6 | 14 | 6 | 14 |
| Density, PCF | 72.3 | 35.4 | 97.7 | 34.2 | 102.5 | 34 | 93.5 | 35 |
| Conductivity | no | yes | no | yes | n/t | n/t | yes | yes |

*Silver-coated nickel spheres
n/t: not tested

As can be seen from the results in Table 3A, nickel column formation was observed in all runs. The cured foams had a thickness approximately equal that of a single cell in the foam (10 to 15 mils (254 to 381 micrometers)). Foams having a thickness approximating to the diameter of the cells across the thickness of the foam (the z-direction) were conductive. The combination of thinner foams and use of a top carrier consistently resulted in conductive foams of good quality.

Results of resistivity testing for Runs 1b, 2b, and 4b of Table 3A are shown in Table 3B.

TABLE 3B

| | Nickel spheres | | Foam | | Volume resistivity, ohm-cm | | |
|---|---|---|---|---|---|---|---|
| Run | Size, μm | Volume % | Thickness, mil | Density, pcf | 100 psi | 200 psi | 400 psi |
| 1b | 45-75 | 13 | 8 | 35 | 1.02 | 0.35 | 0.15 |
| 2b | 45-75 | 13 | 14 | 34 | 9.44 | 0.67 | 0.23 |
| 4b | 75-90* | 13 | 6 | 35 | 0.04 | 0.01 | 0.01 |

*Silver-coated Ni spheres

Good conductivity was observed for all three runs. Run 1b and 4b displayed particularly good volume resistivity.

Example 4

Based on the results observed for Example 3, an additional set of foams were formulated and tested as shown in Table 4A. The filler consisted of 100% Ni microspheres or silver-coated nickel spheres. A PET top carrier was used in all of the runs. Further in all of the runs, the premix was cooled in a refrigerator.

The volume resistivities and other properties of Runs 4-8 of Table 4A are further illustrated in Table 4B.

TABLE 4B

| | Nickel spheres | | Foam | | | | Volume resistivity, ohm-cm | | |
|---|---|---|---|---|---|---|---|---|---|
| Run | Size, μm | Volume % | Thickness, mil | Density, pcf | CFD, psi | C-set, % | 100 psi | 200 psi | 400 psi |
| 4 | 45-75 | 8 | 23 | 24 | n/t | n/t | 16.6 | 7.7 | 1.1 |
| 5 | 45-75 | 13 | 24 | 32 | n/t | n/t | 17.2 | 3.1 | 1.4 |
| 6 | 75-150 | 8 | 32 | 24 | 1.0 | 2.8 | 1.3 | 0.1 | 0.04 |
| 7 | 75-150 | 13 | 31 | 31 | 3.9 | 1.7 | 4.6 | 0.2 | 0.05 |
| 8 | 75-90* | 8 | 28 | 24 | n/t | n/t | 1.5 | 0.6 | 0.2 |

*Silver-coated nickel microspheres
CFD at 25%
C-set at 100° C.

Table 4B shows that the foams have good conductivity values at 100, 200, and 400 psi (689, 1379, and 2758 kilopascals, respectively). For example, a volume resistivity of 1.3 and 0.04 ohm-centimeter at 100 and 400 psi respectively, with 8 volume percent filler (44 weight percent) for trial 9. The foams possessed other favorable properties such as softness (CFD of 1-4 psi (700-2,800 kg/m$^2$) at 25%, low C-set of 2-3% at 100° C., and low density (20-35 pcf).

Example 5

Thicker foams (25-40 mils) were also prepared as shown in Table 5. The filler used was either 100% nickel spheres or nickel-coated steel spheres, and was generally of larger size (75-150 micrometers, 100-150 micrometers, 150-177 micrometers, or 177-200 micrometers). The filler loadings were at 8, 12, and 14 (I don't see any 13% level examples in that table) volume percent. The formulations were cast to a thickness of 7 mils onto a first PET release layer, and a PET top carrier layer was placed on the. They were exposed to a magnetic field of the indicated intensity and duration, while foamed and cured at 70° C. as shown in Table 5.

The results in Table 5 show that good conductivity was observed. The foams produced have good foam quality and conductivity.

TABLE 4A

| | Run No. | | | | | | | | | |
|---|---|---|---|---|---|---|---|---|---|---|
| | 1 | 2 | 3 | 4 | 5 | 6 | 7 | 8 | 9 | 10 |
| Magnetic field, Gauss | 250 | 250 | 250 | 250 | 250 | 250 | 250 | 250 | 250 | 250 |
| Casting thickness, mil | 8 | 8 | 8 | 8 | 8 | 8 | 8 | 8 | 8 | 8 |
| Oven temp, ° C. | 70 | 70 | 70 | 70 | 70 | 70 | 70 | 70 | 70 | 70 |
| Oven residence time, min | 5 | 4 | 4 | 4 | 4 | 4 | 4 | 4 | 4 | 4 |
| Si formulation A/B, gras | 32/4 | 32/4 | 32/4 | 32/4 | 32/4 | 32/4 | 32/4 | 32/4 | 32/4 | 32/4 |
| Inhibitor, drops (about 40 mg) | 5 | 5 | 5 | 5 | 5 | 5 | 5 | 5 | 5 | 5 |
| Filler diameter, micrometers | 75-150 | 75-150 | 75-150 | 45-75 | 45-75 | 75-150 | 75-150 | 75-90* | 75-150 | 75-150 |
| Filler loading, grams | 48 | 28 | 48 | 28 | 48 | 28 | 48 | 28 | 28 | 48 |
| Filler loading, vol % | 13 | 8 | 13 | 8 | 13 | 8 | 13 | 8 | 8 | 13 |
| Ratio of foam thickness to average cell height | 1-1.5 | 1 | 1 | 1 | 1 | 1 | 1 | 1 | 1 | 1 |
| Foam thickness, mil | 39 | 33 | 34 | 25 | 25 | 32 | 31 | 28 | 29 | 30 |
| Foam density, PCF | 29 | 22.3 | 29.8 | 22.9 | 31.7 | 23.5 | 30.5 | 23.9 | 24.9 | 32.6 |
| Conductivity | yes | yes | yes | yes | Yes | yes | yes | yes | yes | yes |

*silver-coated nickel spheres

TABLE 5

| | Run # | | | | | | | | |
|---|---|---|---|---|---|---|---|---|---|
| | R1 | R2 | R3 | R4 | R5 | R6 | R7 | R8 | R9 |
| Magnetic field, gauss | 750 | 750 | 750 | 750 | 750 | 750 | 1000 | 1000 | 1000 |
| Magnetic field duration, min | 1 | 1 | 1 | 1 | 1 | 2 | 2 | 2 | 2 |
| Oven temperature, ° C. | 70 | 70 | 70 | 70 | 70 | 70 | 70 | 70 | 70 |
| Oven residence time, min | 4 | 4 | 4 | 4 | 4 | 4 | 4 | 4 | 4 |
| Coating thickness, mil | 7 | 7 | 7 | 7 | 7 | 7 | 7 | 7 | 7 |
| 8137A/B, 8/1 | 48/6 | 48/6 | 48/6 | 48/6 | 48/6 | 48/6 | 48/6 | 48/6 | 48/6 |
| Inhibitor*, ppm | 350 | 1000 | 1500 | 1000 | 1500 | 2000 | 1500 | 2000 | 1500 |
| Ni sphere, micrometers | 75-150 | 75-150 | 75-150 | 75-150 | 75-150 | 75-150 | — | — | — |
| Ni-coated steel, micrometers | — | — | — | — | — | — | 177-200 | 177-200 | 177-200 |
| Filler loading, grams | 42 | 42 | 42 | 64 | 64 | 64 | 60 | 60 | 72 |
| Filler, vol % | 8 | 8 | 8 | 12 | 12 | 12 | 12 | 12 | 14 |
| Foam thickness, mil | 28 | 29 | 31 | 35 | 35 | 34 | 37 | 36 | 37 |
| Volume resistivity, ohm-cm | | | | | | | | | |
| at 100 psi | 0.9 | 0.8 | 0.8 | 1.0 | 1.0 | 1.3 | 0.6 | 1.1 | 1.4 |
| at 200 psi | 0.4 | 0.4 | 0.4 | 0.4 | 0.4 | 0.4 | 0.2 | 0.3 | 0.3 |
| at 400 psi | 0.2 | 0.2 | 0.2 | 0.1 | 0.1 | 0.2 | 0.1 | 0.1 | 0.1 |

| | Run # | | | | | | | | |
|---|---|---|---|---|---|---|---|---|---|
| | R10 | R11 | R12 | R13 | R14 | R15 | R16 | R17 | R18 |
| Magnetic field, gauss | 1000 | 1000 | 1000 | 1000 | 1000 | 1000 | 1000 | 1000 | 1000 |
| Magnetic field duration, min | 2 | 2 | 2 | 2 | 2 | 2 | 2 | 2 | 2 |
| Oven temperature, ° C. | 70 | 70 | 70 | 70 | 70 | 70 | 70 | 70 | 70 |
| Oven residence time, min | 4 | 4 | 4 | 4 | 4 | 4 | 4 | 4 | 4 |
| Coating thickness, mil | 7 | 7 | 7 | 7 | 7 | 7 | 7 | 7 | 7 |
| 8137A/B, 8/1 | 48/6 | 48/6 | 48/6 | 48/6 | 48/6 | 48/6 | 48/6 | 48/6 | 48/6 |
| Inhibitor*, ppm | 2000 | 1000 | 1500 | 1000 | 1500 | 1500 | 2000 | 1500 | 2000 |
| Ni sphere, micrometers | — | — | — | — | — | — | — | — | — |
| Ni-coated steel, micrometers | 177-200 | 150-177 | 150-177 | 150-177 | 150-177 | 100-150 | 100-150 | 100-150 | 100-150 |
| Filler loading, grams | 72 | 60 | 60 | 72 | 72 | 72 | 72 | 60 | 60 |

TABLE 5-continued

| Filler, vol % | 14 | 12 | 12 | 14 | 14 | 14 | 14 | 12 | 12 |
|---|---|---|---|---|---|---|---|---|---|
| Foam thickness, mil | 39 | 33 | 34 | 34 | 35 | 35 | 27 | 34 | 34 |
| Volume resistivity, ohm-cm | | | | | | | | | |
| at 100 psi | 1.7 | 0.6 | 0.8 | 0.7 | 1.4 | 1.1 | 10.9 | 1.5 | 1.7 |
| at 200 psi | 0.4 | 0.2 | 0.3 | 0.3 | 0.3 | 0.4 | 1.2 | 0.6 | 0.8 |
| at 400 psi | 0.1 | 0.1 | 0.1 | 0.1 | 0.1 | 0.2 | 0.4 | 0.2 | 0.2 |

*1-octyn-3-ol

Example 6

Electrically conductive polymer foams were prepared on a removable layer comprising a low tack adhesive disposed on a PET carrier tape. The low tack adhesive tape used in this particular example is ESM-3815 from ESD Korea, Co., Ltd., which has an adhesive layer of 15 μm and a PET layer of 38 μm. Polyurethane foam was loaded with electrically and magnetically conductive particles of nickel-coated stainless steel, and blended and frothed through a mixhead. The foam mixture was then cast onto the adhesive side of the removable layer. A magnetic field was applied and the foam mix was cured on heating plates with temperatures ranging from 200° F. to 450° F. As the adhesive warmed up, the adhesive softened so as to allow the particles to project from the foam surface and embed into the adhesive layer. After the foam mixture was cured and the adhesive layer re-solidified, the removable layer was removed, leaving the conductive particles more exposed at the surface side formerly adjoining the adhesive.

Conductivity measurements were performed on a foam sample prepared with the adhesive described above and compared against a control sample that was not cast on a removable layer. In the control sample, the foam was cast directly on a paper carrier without an adhesive. Table 6 shows five conductivity tests taken of the control and removable layer samples, with the results averaged together. As shown in Table 6, there is a significant increase in conductivity of the polymer foam prepared with adhesive described above as compared the control foam cast directly on the paper carrier.

TABLE 6

| Resistance at 20 psi (Ohm) | |
|---|---|
| Control | With Removable Layer |
| 2.042 | 0.11 |
| 0.12 | 0.041 |
| 0.882 | 0.082 |
| 0.216 | 0.044 |
| 0.622 | 0.111 |
| Avg. 0.776 | Avg. 0.078 |

Figure 3:
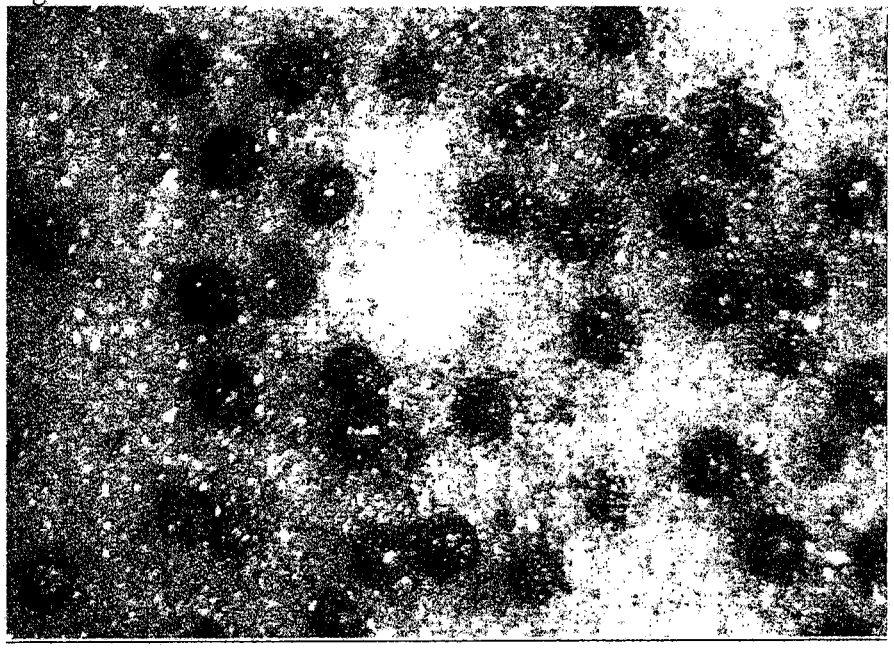
FIG. 3 is a photograph taken through an optical microscope of an exemplary foam layer comprising electrically conductive particles cast on and embedded into a removable layer, with the removable layer removed so as to expose the electrically conductive particles.
Figure 4:
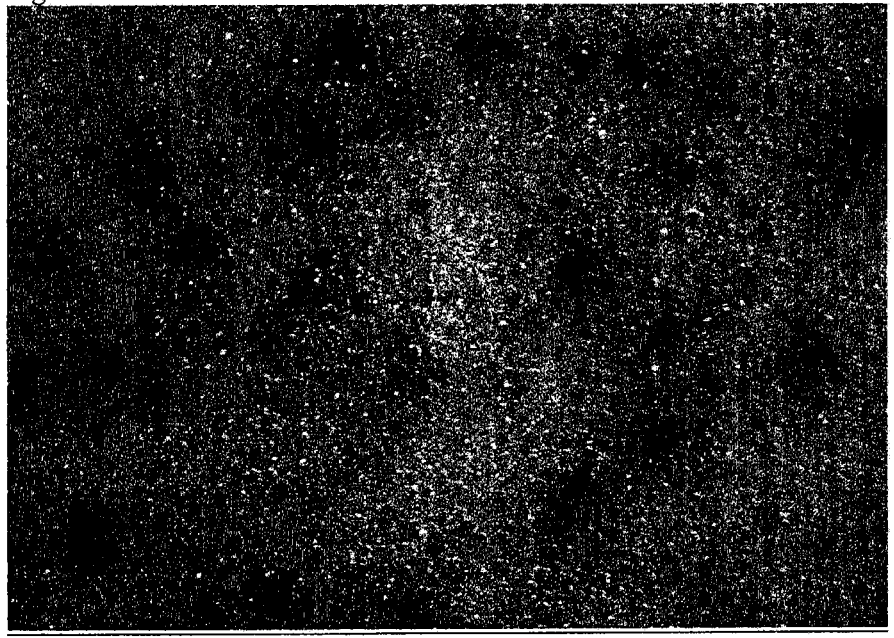
FIG. 4 is a photograph taken through an optical microscope of a comparison foam layer comprising electrically conductive particles cast without a removable layer.

FIG. 3 is a photograph taken through an optical microscope of the foam layer cast on the removable layer described above, with the removable layer removed, and the surface of the foam layer formerly adjoining the removable layer photographed. FIG. 4 is a photograph taken through an optical microscope of a foam layer cast directly on a paper carrier, and not a removable layer as described above, with the carrier removed after curing. It should be noted that the large dark circles and spots on both SEM photographs indicate the conductive particles. As can be seen from the SEM photographs, FIG. 3 displays significantly more exposure of the particles at the surface formerly adjoining the removable layer as compared to FIG. 4. The conductive particles in FIG. 4 without the removable layer shows the particles covered by elastomer and that cells of the foam also obscure the particles indicating that the particles are near the surface but not exposed The terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). All ranges disclosed within this specification and directed to the same measurement or quantity are inclusive of the stated endpoint, and are independently combinable. All references are incorporated herein by reference in their entirety.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of manufacturing a polymer foam layer, the method comprising:
    forming a precursor layer comprising
        a polymer foam precursor composition, and
        a filler composition comprising a plurality of magnetic, electrically conductive particles,
        wherein the precursor layer has a first surface and a second opposite surface, and is formed having the first surface disposed on a first removable layer;
    foaming the foam precursor composition to form a foamed layer, wherein the foamed layer has a plurality of cells;
    applying to the foamed layer a magnetic field of a strength and for a time effective to align the magnetic, electrically conductive particles into mutually isolated columns having a first end and a second end, wherein the particles essentially continuously span the foam layer between the first surface and the opposite second surface;
    curing the foamed layer; and
    prior to or during curing, exposing the first removable layer to heat at a temperature and for a time effective to allow the first ends of the columns adjacent to the first removable layer to partially embed in the first removable layer.

2. The method of claim 1, further comprising:
    prior to or during curing, disposing a second removable layer on the second surface of the polymer foam layer; and
    prior to or during curing, exposing the second removable layer to heat at a temperature and for a time effective to allow the second ends of the columns adjacent to the second removable layer to partially embed in the second removable layer.

3. The method of claim 2, further comprising removing the first and/or second removable layer to expose the first end and/or second end of the columns.

4. The method of claim 3, wherein removing the first and/or second removable layer further comprises removing a portion of the first surface and/or the second opposite surface from the precursor layer to further expose the first end and/or second end of the columns.

5. The method of claim 3, wherein the applied magnetic field has a flux density of about 100 to about 1500 Gauss.

6. The method of claim 5, wherein the magnetic field is applied during foaming of the composition.

7. The method of claim 5, wherein the magnetic field is applied prior to curing the foamed layer.

8. The method of claim 5, further comprising partially curing the foam layer prior to fully curing the layer, wherein the magnetic field is applied after partially curing the foam layer.

9. A method of manufacturing a silicone foam comprising:
extruding a mixture onto a first removable layer, the mixture comprising a polysiloxane polymer having hydride substituents, a blowing agent, a platinum based catalyst, and a filler composition comprising a plurality of magnetic, electrically conductive particles; and
blowing and curing the mixture in an applied magnetic field to align the magnetic, electrically conductive particles into mutually isolated pathways that essentially continuously span the foam between a first surface and a second opposite surface of the foam and partially embed into the first removable layer, wherein the first surface of the foam adjoins the first removable layer.

10. The method of claim 9, further comprising
prior to or during curing, disposing a second removable layer on the foam, wherein the second surface of the foam adjoins the second removable layer, and
prior to or during curing, applying the magnetic field in order to partially embed the magnetic, electrically conductive particles into the second removable layer.

11. The method of claim 9, further comprising removing the first and/or second removable layer.

* * * * *